(12) United States Patent
Suto et al.

(10) Patent No.: US 12,442,789 B2
(45) Date of Patent: Oct. 14, 2025

(54) SEMICONDUCTOR DEVICE, BIOSENSOR, BIOSENSOR ARRAY, AND LOGIC CIRCUIT

(71) Applicants: Ryota Suto, Tokyo (JP); Katsuya Ujimoto, Tokyo (JP)

(72) Inventors: Ryota Suto, Tokyo (JP); Katsuya Ujimoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 613 days.

(21) Appl. No.: 17/873,159

(22) Filed: Jul. 26, 2022

(65) Prior Publication Data
US 2023/0032228 A1   Feb. 2, 2023

(30) Foreign Application Priority Data

Jul. 30, 2021  (JP) ................... 2021-125807
May 27, 2022  (JP) ................... 2022-087025

(51) Int. Cl.
*G01N 27/414*   (2006.01)

(52) U.S. Cl.
CPC ..... *G01N 27/4145* (2013.01); *G01N 27/4146* (2013.01); *G01N 27/4148* (2013.01)

(58) Field of Classification Search
CPC .......... G01N 27/4145; G01N 27/4148; G01N 27/4146
See application file for complete search history.

(56) References Cited

U.S. PATENT DOCUMENTS

| 2007/0295988 A1 | 12/2007 | Yamamoto et al. |
| 2010/0126885 A1 | 5/2010 | Jechi et al. |
| 2017/0059514 A1* | 3/2017 | Hoffman ............ G01N 33/5438 |
| 2018/0172627 A1* | 6/2018 | Chang ................ H10D 30/6744 |

FOREIGN PATENT DOCUMENTS

| JP | 2010-151540 | 7/2010 |
| JP | 4777159 | 8/2011 |

* cited by examiner

*Primary Examiner* — Sue A Purvis
*Assistant Examiner* — Aneta B Cieslewicz
(74) *Attorney, Agent, or Firm* — XSENSUS LLP

(57) ABSTRACT

A semiconductor device includes a first gate electrode, a first insulating unit, a source electrode, a drain electrode, and a contact part. The first insulating unit is provided on a second gate electrode configured to control a reference voltage in a transport characteristic. The source electrode is connected to the first insulating unit. The drain electrode is connected to the first insulating unit. The contact part is provided between the source electrode and the drain electrode on the first insulating unit, and being able to be in contact with a sample. The sample is able to be in contact with the first gate electrode. A surface opposite to the first insulating unit, of the contact part is configured to be in contact with the sample.

14 Claims, 23 Drawing Sheets

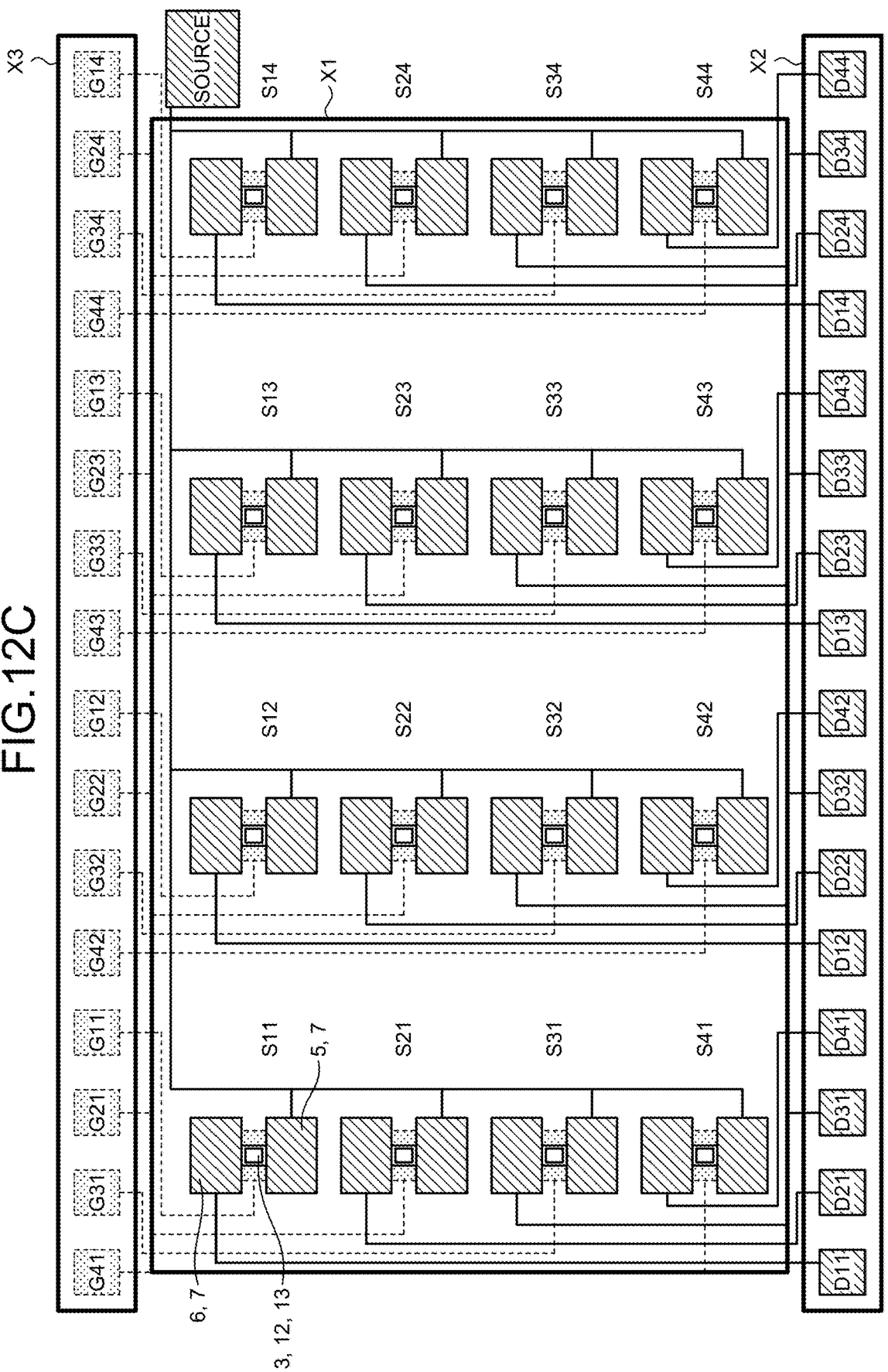

HORMONES ARE WELL BALANCED

HORMONES ARE NOT BALANCED

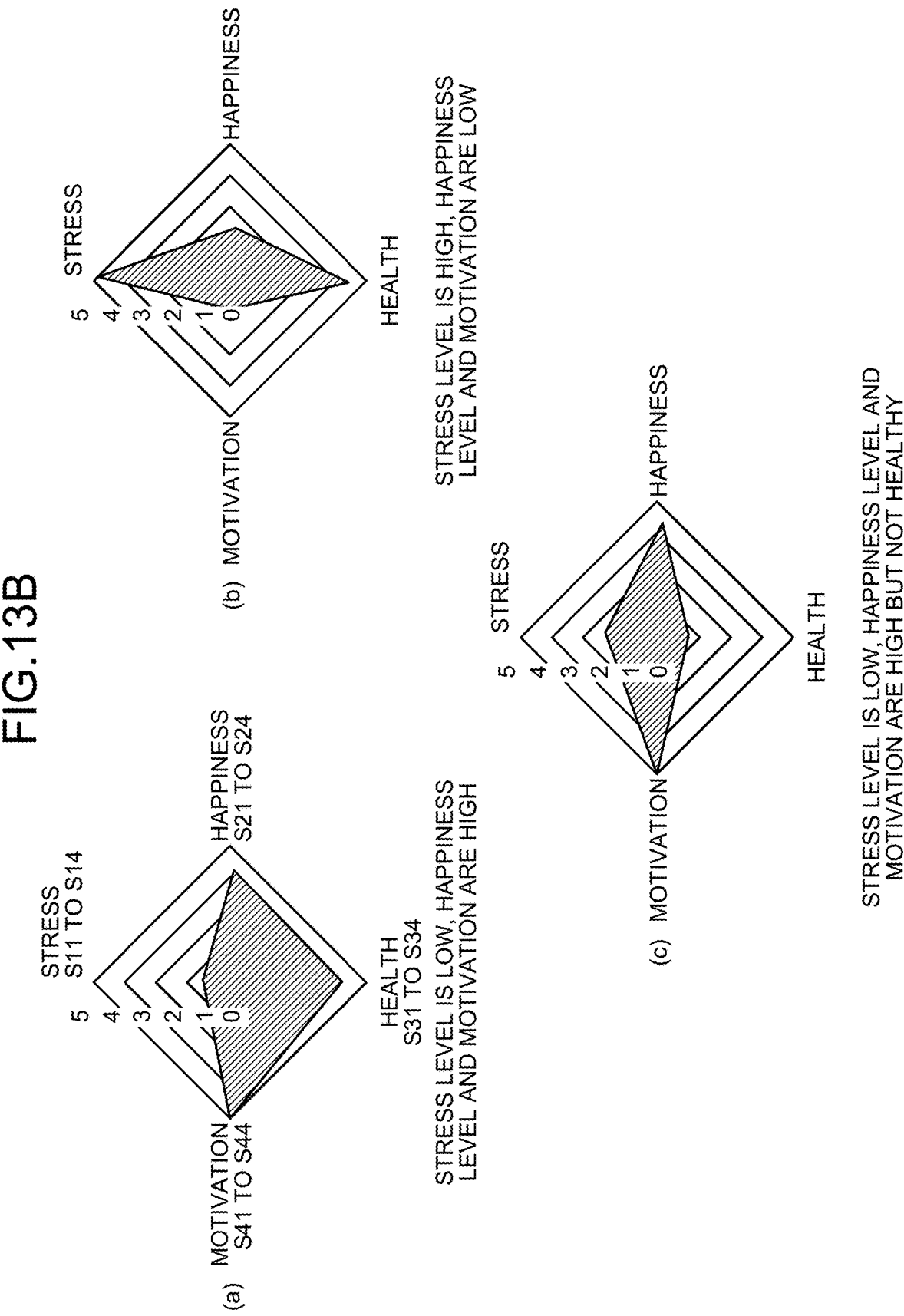

SEMICONDUCTOR DEVICE, BIOSENSOR, BIOSENSOR ARRAY, AND LOGIC CIRCUIT

CROSS-REFERENCE TO RELATED APPLICATIONS

The present application claims priority under 35 U.S.C. § 119 to Japanese Patent Application No. 2021-125807, filed on Jul. 30, 2021, and Japanese Patent Application No. 2022-087025, filed on May 27, 2022. The contents of which are incorporated herein by reference in their entirety.

BACKGROUND OF THE INVENTION

1. Field of the Invention

The present invention relates to a semiconductor device, a biosensor, a biosensor array, and a logic circuit.

2. Description of the Related Art

Various sensors have been researched and developed conventionally, and sensors are widely used in industrial and medical applications, as well as in ordinary homes, and are indispensable in the modern society. Sensors can be classified according to, for example, measurement objects, signal conversion functions, or constituent materials, and the signal conversion functions can be broadly classified into physical sensors, chemical sensors, and biosensors.

Among these sensors, biosensors are measurement devices that mimic or directly utilize the superior molecular recognition capabilities of living organisms, and are attracting attention because of their potential for the wide range of applications.

For example, biosensors utilizing field-effect transistors (FETs) have been attracting attention in recent years because sensing is possible utilizing the fact that the amount of charges in the channel changes in accordance with the concentration of the target substance, making sensing simple and convenient. In one of the conventionally known technologies to enable sensing with higher sensitivity, atomic layer materials such as graphene having high field-effect mobility and a large surface area or microfiber materials such as carbon nanotubes (CNTs) are used as the channel materials in order to enable the sensing of a smaller amount.

Japanese Patent No. 4777159 discloses a dual-gate transistor sensor with a first gate for forming a channel in an upper layer region of a semiconductor layer and a second gate for applying Coulomb force to reduce leakage current from the channel into solution, for the purpose of high-sensitivity detection and stable electrical characteristic measurement.

However, conventional biosensors utilizing FETs with channels formed of atomic layer materials such as graphene or microfiber materials such as CNTs have a problem that the reference voltage (the gate voltage at which the drain current becomes minimal in the case of ambipolar devices such as graphene FETs (=Dirac voltage), or threshold voltage in the case of P-type or N-type FETs) in the transport characteristic (gate voltage ($V_g$) vs. drain current ($I_d$) characteristic) varies largely between sensors and in the case of forming an array, accurate measurement fails.

SUMMARY OF THE INVENTION

According to an aspect of the present invention, a semiconductor device includes a first gate electrode, a first insulating unit, a source electrode, a drain electrode, and a contact part. The first insulating unit is provided on a second gate electrode configured to control a reference voltage in a transport characteristic. The source electrode is connected to the first insulating unit. The drain electrode is connected to the first insulating unit. The contact part is provided between the source electrode and the drain electrode on the first insulating unit, and being able to be in contact with a sample. The sample is able to be in contact with the first gate electrode. A surface opposite to the first insulating unit, of the contact part is configured to be in contact with the sample.

BRIEF DESCRIPTION OF THE DRAWINGS

FIG. 12C is a plan view illustrating another modification of the biosensor array;

FIG. 13B is a diagram illustrating an example in which the stress level, happiness level, health level, and motivation are visualized;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
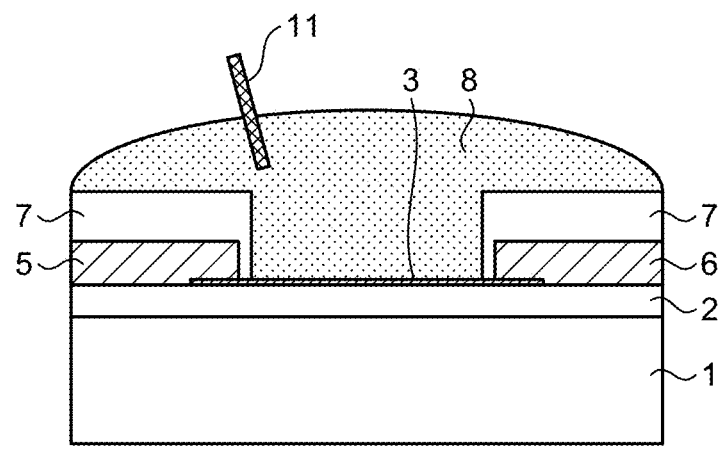
FIG. 1 is a schematic cross-sectional view illustrating a conventional single-gate FET.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a semiconductor device, a biosensor, a biosensor array, and a logic circuit, in which the variation in characteristic between sensors can be suppressed and controlled and accurate measurement is possible, even in the arrangement as an array.

With reference to the accompanying drawings, embodiments of a semiconductor device, a biosensor, a biosensor array, and a logic circuit are described in detail below.

First Embodiment

First, a conventional single-gate FET and a biosensor using the single-gate FET are described.

Here, FIG. 1 is a schematic cross-sectional view illustrating the conventional single-gate FET. As illustrated in FIG. 1, the single-gate FET has one gate electrode 11. The single-gate FET includes a substrate 1, an insulating film 2, a channel 3, source/drain electrodes 5 and 6, an insulating film 7, and the gate electrode 11. The single-gate FET operates as a field-effect transistor (FET) by forming an electric double layer at the interface between the channel 3 and a sample 8 placed on the channel 3 with voltage applied to the gate electrode 11 and controlling the drain current flowing between the source/drain electrodes 5 and 6.

Figure 2:
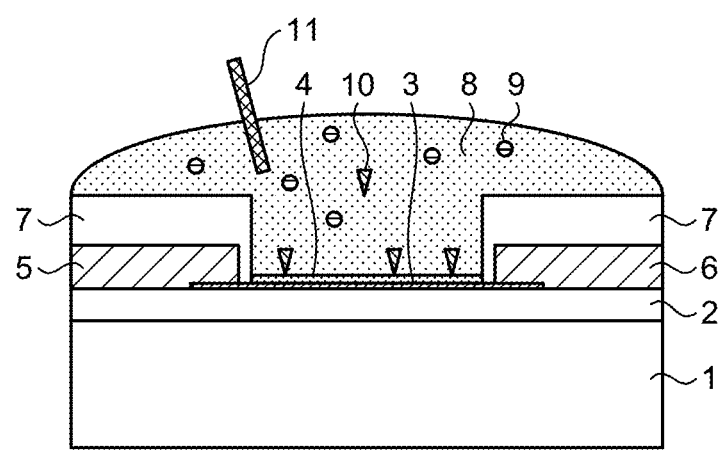
FIG. 2 is a schematic cross-sectional view illustrating a sensor utilizing the conventional single-gate FET.

Here, FIG. 2 is a schematic cross-sectional view illustrating a sensor utilizing the conventional single-gate FET. As illustrated in FIG. 2, the sensor using the single-gate FET includes the substrate 1, the insulating film 2, the channel 3, the source/drain electrodes 5 and 6, the insulating film 7, and the gate electrode 11, and moreover, on a surface layer of the channel 3, includes a receptor layer 4 that captures a target substance 10 contained in the sample 8 that is placed on the channel 3. The sample 8 may also contain a substance 9 other than the target substance 10.

Note that when the receptor layer 4 captures the target substance 10, it means that only the target substance 10 specifically interacts with the receptor layer 4. For example, the capture of the target substance 10 by the receptor layer 4 includes hydrogen bonding and binding by van der Waals force, carrier-ionophore reaction, protein interactions such as antigen-antibody reactions and amino acid-protein interactions, RNA-protein interactions, DNA-DNA interactions, and enzyme-substrate reactions.

The sensor using the single-gate FET forms an electric double layer at an interface between the receptor layer 4 and the sample 8 by applying voltage to the gate electrode 11. In the sensor using the single-gate FET, drain current flows between the source/drain electrodes 5 and 6 when the voltage equal to or higher than the threshold voltage is applied to the gate electrode 11. As a result, the drain current changes depending on the concentration of the target substance 10; therefore, by utilising this drain current, the sensor using the single-gate FET can detect the target substance 10 contained in the sample 8.

Figure 3:
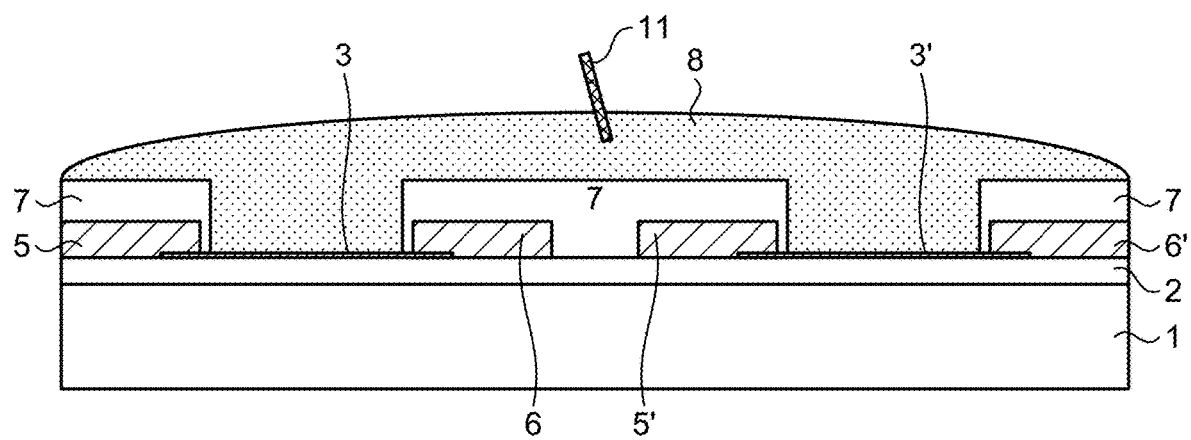
FIG. 3 is a schematic cross-sectional view illustrating a conventional single-gate FET array.
Figure 4:
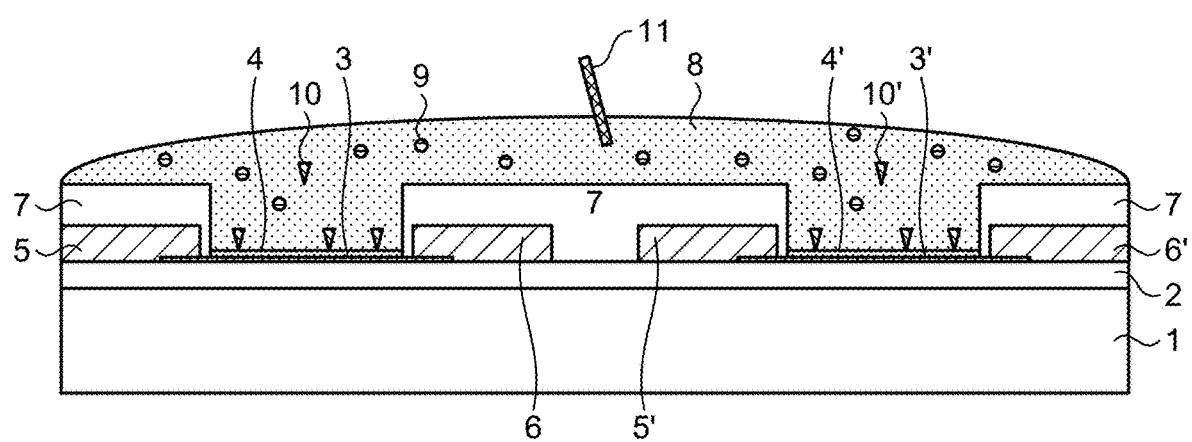
FIG. 4 is a schematic cross-sectional view illustrating a sensor array using the conventional single-gate FET.

FIG. 3 is a schematic cross-sectional view illustrating a conventional single-gate FET array, and FIG. 4 is a schematic cross-sectional view illustrating a sensor array using the conventional single-gate FET. As illustrated in FIG. 3 and FIG. 4, when transistors or sensors are arrayed, carriers (electrons or holes) are transferred between the channel 3 and the insulating film 2, the receptor layer 4, the sample 8, etc., which are in contact with the channel 3, and it has been concerned that the reference voltage (threshold voltage) in the transport characteristic (gate voltage (Vg) vs. drain current (Id) characteristic) varies between the sensors or the lots, making it difficult to perform accurate measurement. In particular, in the case of the sensor array illustrated in FIG. 4, the receptor layers 4 and 4' may be different when sensing the different target substances 10 and 10', in which case consequently the reference voltages will be different.

In this regard, a single transistor or sensor as illustrated in FIG. 1 and FIG. 2 can control the reference voltage by using a conductive substrate as the substrate 1, for example, highly doped silicon, and inducing carriers in the channel with the voltage applied to the substrate 1. However, when the transistors or the sensors are arrayed as illustrated in FIG. 3 and FIG. 4, the same amount of voltage is applied to all sensors, and since the reference voltage cannot be controlled individually for each sensor, variation in the reference voltage between the sensors or between the lots cannot be reduced.

In view of this, a purpose of this embodiment is to suppress and control the characteristic variation between the sensors in the transistor array and to perform accurate measurement.

Figure 5:
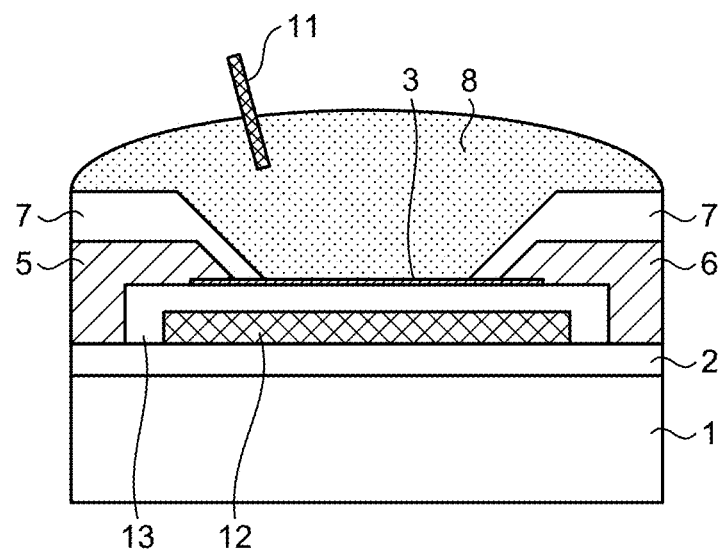
FIG. 5 is a schematic cross-sectional view illustrating a dual-gate FET according to a first embodiment.

FIG. 5 is a schematic cross-sectional view illustrating a dual-gate FET according to the first embodiment. As illustrated in FIG. 5, the dual-gate FET, which is a semiconductor device, has two gate electrodes 11 and 12. The dual-gate FET includes the structure of the conventional single-gate FET, which includes the substrate 1, the insulating film 2, the channel 3, the source/drain electrodes 5 and 6, the insulating film 7, and the first gate electrode 11, and additionally includes the second gate electrode 12 and a solid insulating film layer 13 as a first insulating unit. The dual-gate FET forms an electric double layer at the interface between the channel 3 and the sample 8 placed on the channel 3 by applying voltage to the gate electrode 11. The dual-gate FET operates as a field-effect transistor (FET) by controlling the drain current flowing between the source/drain electrodes 5 and 6 through the control of the voltage applied to the gate electrode 11.

Figure 6:
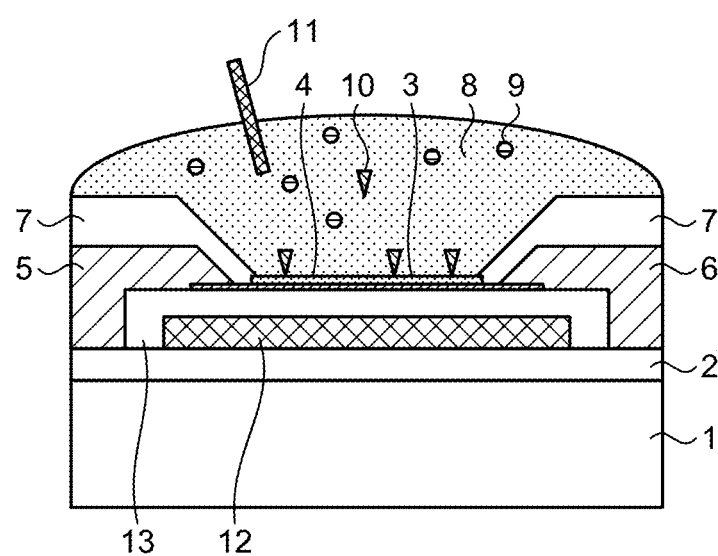
FIG. 6 is a schematic cross-sectional view illustrating a sensor utilizing the dual-gate FET.

FIG. 6 is a schematic cross-sectional view illustrating a sensor utilizing the dual-gate FET. As illustrated in FIG. 6, the sensor using the dual-gate FET includes the substrate 1, the insulating film 2, the channel 3, the source/drain electrodes 5 and 6, the insulating film 7, the first gate electrode 11, the second gate electrode 12, and the solid insulating film layer 13, and additionally, includes the receptor layer 4 corresponding to a receiving unit that captures the target substance 10 contained in the sample 3. The sample 8 may also contain the substance 9 other than the target substance 10.

The sensor using the dual-gate FET forms the electric double layer at the interface between the receptor layer 4 and the sample 8 by applying voltage to the first gate electrode 11. The sensor using the dual-gate FET allows drain current to flow between the source/drain electrodes 5 and 6 when appropriate gate voltage that is equal to or higher than the threshold voltage is applied to the first gate electrode 11. As a result, since the drain current changes in accordance with the concentration of the target substance 10, the sensor using the dual-gate FET can detect the target substance by utilizing the drain current change by the change of the charge in the channel 3.

The material of the channel 3 may be an atomic layer material with high field-effect mobility and a large surface area, such as graphene, or a microfiber material such as carbon nanotubes (CNTs). By using nanomaterials including the atomic layer material or the microfiber material, the thickness of the channel 3 is less than 10 nm, preferably equal to or less than 1 nm (for several atomic layers). Thus, higher sensitivity can be expected by using the atomic layer material with a large surface area or the microfiber material.

For graphene, since it is several atomic layers (1 layer=3.5 Å) that express the function as graphene, it would be ideal if the entire channel region was for several atomic layers. In fact, however, a multilayer region is often formed in the island-like shape on a sheet on the atomic layer, and the height is about 10 nm or less when actually measured with an AFM. For carbon nanotubes (CNTs), the diameter is defined as 0.4 to 50 nm. In the use as a transistor, CNTs with several nanometers in diameter are generally used, and the thickness is about 10 nm if the region where such CNTs are stacked is also taken info account.

Figure 7:
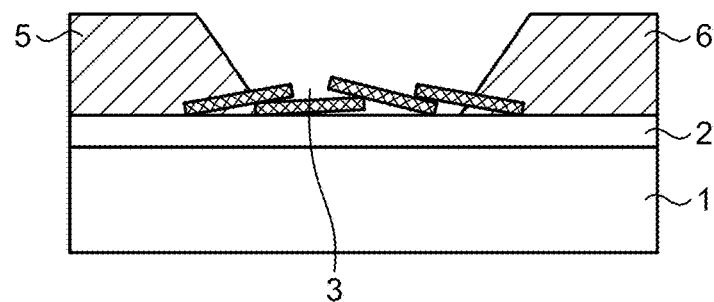
FIG. 7 is a diagram illustrating an example of using a CNT network as a channel.

Here, FIG. 7 is a diagram illustrating an example of using a CNT network as the channel 3. As illustrated in FIG. 7, the channel 3 may be a CNT network formed by a number of carbon nanotubes (CNTs). Such a CNT network has a large surface area and high field-effect mobility; therefore, it is expected to increase the sensitivity.

Figure 8:
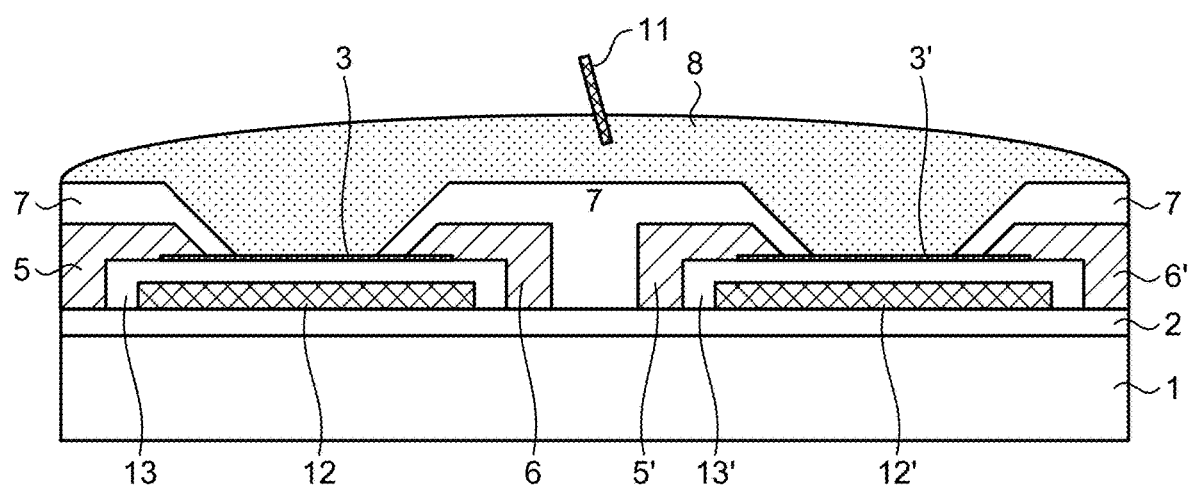
FIG. 8 is a schematic cross-sectional view illustrating a dual-gate FET array.
Figure 9:
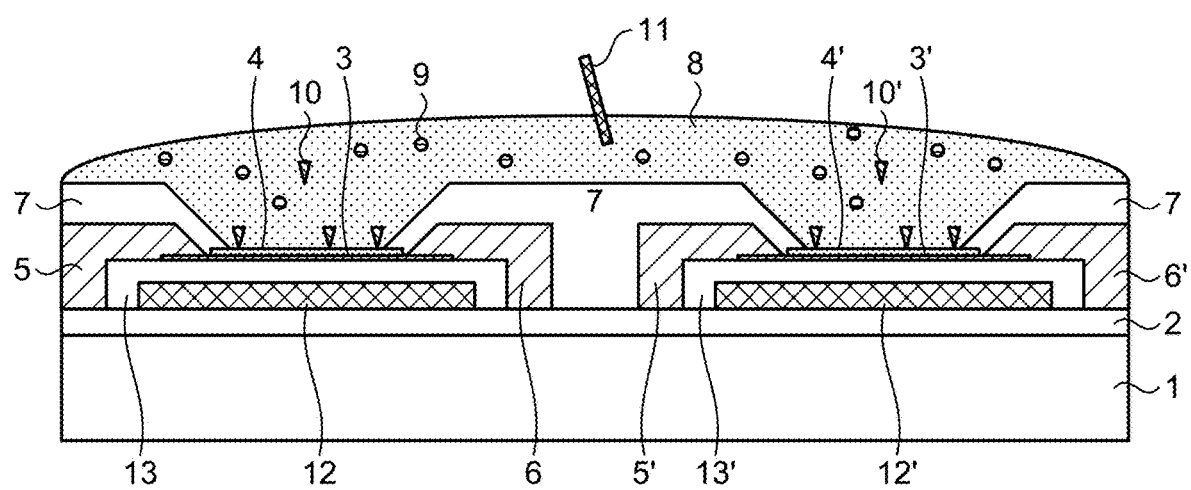
FIG. 9 is a schematic cross-sectional view illustrating a sensor array using the dual-gate FET.

FIG. 8 is a schematic cross-sectional view illustrating the dual-gate FET array, and FIG. 9 is a schematic cross-sectional view illustrating a sensor array using the dual-gate FET. As illustrated in FIG. 8 and FIG. 9, when the transistors or the sensors are arrayed, carriers (electrons or holes) are transferred between the channel 3 and the insulating film 2, the receptor layer 4, the sample 3, etc., which are in contact with the channel 3, in a manner similar to FIG. 3 and FIG. 4. In particular, in the case of the sensor array illustrated in FIG. 9, when sensing the different target substances 10 and 10', the receptor layers 4 and 4' may also be different, and in this case, the amount of carriers transferred to the channels 3 and 3' is different; thus, the Fermi level is also different.

However, when voltage is applied to the second gate electrode 12 as illustrated in FIG. 3 and FIG. 9, even if the array is formed, each sensor has individual second gate electrodes 12 and 12'; therefore, the second gate voltage can be applied individually. Then, the intentional amount of carriers can be induced in the respective channels 3 and 3', and the reference voltage can be controlled.

In other words, according to this embodiment, by applying to the second gate electrodes 12 and 12' of the individual sensors, appropriate voltage that causes the intended amount of carriers to be injected (induced) to or extracted from the channels 3 and 3', the reference voltage can be controlled also between the sensors or between the lots in the transistor array or the sensor array. It is also possible to align the reference voltages of all sensors in the array, or to intentionally shift the reference voltages. By this structure, the reference voltage at each channel can be controlled, and the accuracy of the transistor array or the sensor array can be improved.

There are no particular restrictions on the substrate 1 and the insulating film 2 as long as they are electrically insulated from the upper layer elements. However, a silicon (Si) substrate with high flatness and a thermally oxidized film ($SiO_2$) are preferred to prevent unintended stress from being applied to the upper layer elements and causing unintended characteristic changes. The substrate 1 and the insulating film 2 may be a plastic substrate such as polyimide, PEN, or PET to obtain flexibility.

There are no particular restrictions on the channel 3 as long as the material can operate as a channel in a field-effect transistor (FET). However, when sensing the very small amount (for example, biomolecules such as hormones in saliva), sensing with high sensitivity is required; therefore, graphene with high mobility and carbon nanotubes (CNTs) with semiconductor characteristics are preferred. Graphene is the atomic layer material in which carbon atoms are bonded in the $sp^2$ orbital, and carbon nanotubes (CNTs) are the tubular form of graphene. CNTs can have metallic or semiconductor characteristics depending on their chirality, but the semiconductor type CNTs, or the CNT network containing a number of semiconducting CNTs is applicable here. Other transition metal dichalcogenide (TMDC) typified by molybdenum disulfide ($MoS_2$) and tungsten diselenide ($WSe_2$), which are the same atomic layer materials as graphene, and Si nanowires, are also acceptable.

The receptor layer 4 may be any layer that is formed of a scavenger that can specifically capture only the target subetange 10 without any particular limitation. For example, when the target substance 10 is a molecule, the receptor layer 4 is a molecular imprinting polymer with the molecular template of the target substance 10. While materials derived from living organisms cannot be used repeatedly because molecules can be desorbed by cleaning. Even if the desorption is insufficient, the reproducibility of sensing sensitivity can be maintained by controlling the transistor characteristics after each cleaning with the second gate electrode 12.

If the target substance 10 is an ion, the receptor layer 4 may be an ionophore of an ion exchange membrane. Since the receptor layer 4 can specifically capture the target substance 10, sensing is possible even if the sample 8 contains the substance 9 other than the target substance 10. The receptor layer 4 and the target substance 10 may alternatively be proteins, such as antigens or antibodies, or DNA, when the receptor layer 4 utilizes protein interactions, such as antigen-antibody reactions, or DNA-DNA interactions. As described above, the receptor layer 4 is selected as appropriate according to the target substance 10.

The source/drain electrodes 5 and 6 may be any electrode without any particular restriction and may be, for example, Cr/Au, Ni/Au, Pd/Au, Ti/Ni/Au, or T/Pd/Au. Cr and Ti function as an adhesive layer to the substrate, while Ni and Pd function as a contact resistance reduction layer if, for example, the channel 3 is graphene.

The insulating film 7 is not restricted in particular as long as the function as a passivation film is obtained; however, an aluminum oxide film ($Al_2O_3$) formed by an atomic layer deposition (ALD) method is desirable because of its superior moisture proof.

In order to ensure that the sample 8 enters an opening region that opens on the channel 3, the insulating film 7 may be water-repellent in the regions other than the opening region of the channel 3, for example, an organic film such as parylene or fluororesin, or a silicon nitride film (SiN) formed by a thermal chemical vapor deposition (CVD) method. Alternatively, the insulating film 7 may be a laminate of these films. Further alternatively, the insulating film 7 may be a film that imparts a water-repellent function by utilizing the lotus effect by arranging a microscopic relief structure on the surface.

The area where the channel 3 between the source/drain electrodes 5 and 6 is in contact with the insulating film 7 is desirably as small as possible. Specifically, the insulating film 7 is manufactured by etching with a mask that takes into account the sum of the dimensional error of the photolithography process and the horizontal over-etching amount in the etching process, so that there is no direct contact between the source/drain electrodes 5 and 6 and the sample 8.

Since the region where the insulating film 7 is in contact with the channel 3 between the source/drain electrodes 5 and 6 is the region where the sample 8 is not in contact within the channel region in the channel 3, carriers cannot be induced by the gate voltage applied to the first gate electrode 11 in the region where the insulating film 7 is in contact with the channel 3 between the source/drain electrodes 5 and 6. Therefore, higher voltage is required to induce the same amount of carriers compared to the case without the insulating film 7, resulting in a sensor performance deterioration (specifically, mutual conductance, which is the slope in the transport characteristics).

On the other hand, as illustrated in FIG. 5, etc., the cross-sectional shape of the source/drain electrodes 5 and 6 is forward tapered. The forward tapered cross-sectional shape of the source/drain electrodes 5 and 6 ensures that the insulating film 7 covers the source/drain electrodes 5 and 6. Accordingly, the direct contact between the source/drain electrodes 5 and 6 and the sample 8 can be avoided. The insulating film 7 covers the source/drain electrodes 5 and 6 along their shape; therefore, the cross-sectional shape including the source/drain electrodes 5 and 6 and the insulating film 7 is also forward tapered. This shape makes it easier for the sample 8 to enter the concave part including the channel 3, which is advantageous.

There are no particular restrictions on the sample 8 as long as the sample 8 functions as a gate insulating film for the first gate electrode 11 by filling the space between the first gate electrode 11 and the receptor layer 4 (the channel 3 in the use as a FET (in the absence of the receptor layer 4)), and forms an electric double layer on the surface of the receptor layer 4 by applying voltage to the first gate electrode 11. For example, phosphate-buffered saline (PBS) or potassium chloride (KCl) solution that easily forms the electric double layer is used.

The first gate electrode 11 may be any electrode without particular restrictions; however, in the case of using the electrode as a reference electrode that provides a reference point for potential, an Ag/AgCl electrode or a Pt electrode is preferred. The shape of the first gate electrode 11 is preferably a rod-like shape that can pierce the sample 8, either in a liquid or gel form, but the shape is not limited to a particular shape as long as the first gate electrode 11 can exist in the sample 8. The first gate electrode 11 is arranged so as not to be in contact with the insulating film 7. As for the first gate electrode 11, one gate electrode 11 is used for one channel 3 in FIG. 5 and FIG. 6, but in FIG. 8 and FIG. 9, one gate electrode 11 is used for multiple channels 3.

The second gate electrode 12 may be any electrode without any particular restrictions and may be, for example, Cr/Au, Ti/Ni/Au or Ti/Pt/Au. Cr and Ti function as an adhesive layer to the substrate, while Ni and Pt function as a barrier layer that suppresses the diffusion of Au into the substrate. The second gate electrode 12 may be Al, which is commonly used in ICs, or Ag, which can be formed by printing.

The width of the second gate electrode 12 is preferably equal to or more than the channel length (the distance between the source/drain electrodes 5 and 6). By this structure, the flatness of the channel 3 can be maintained, leading to the advantageous effects that defects and stress do not enter the channel 3 easily, and the characteristic deteriorates less easily.

Figure 10A:
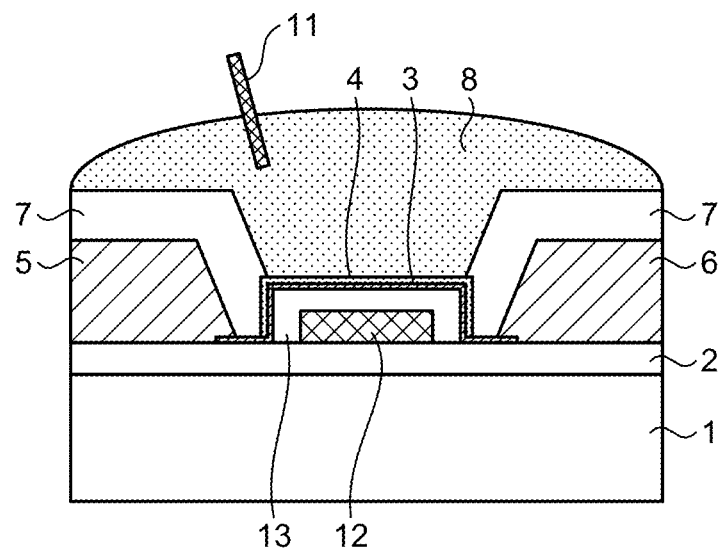
FIG. 10A is a diagram illustrating a case where the width of a second gate electrode is smaller than a channel length.

Here, FIG. 10A illustrates the case where the width of the second gate electrode 12 is smaller than the channel length. As illustrated in FIG. 10A, if the width of the second gate electrode 12 is smaller than the channel length (the distance between the source/drain electrodes 5 and 6), the channel 3 may bend to introduce defects and stress into the channel 3, which may degrade the transistor characteristics. This similarly applies to the receptor layer 4.

There are no particular restrictions on the solid insulating film layer 13 as long as the function as a gate insulating film for the gate electrode 12 can be obtained; however, a dense insulating film with high dielectric strength voltage, for example, an aluminum oxide film ($Al_2O_3$) formed by the above ALD method is preferred. The solid insulating film layer 13 may be silicon oxide ($SiO_x$) formed by the ALD method, hafnium oxide ($HfO_2$) with a high dielectric constant, or silicon oxide formed by a plasma enhanced-chemical vapor deposition (PE-CVD) method. Alternatively, the solid insulating film layer 13 may be a laminate of these films.

Figure 10B:
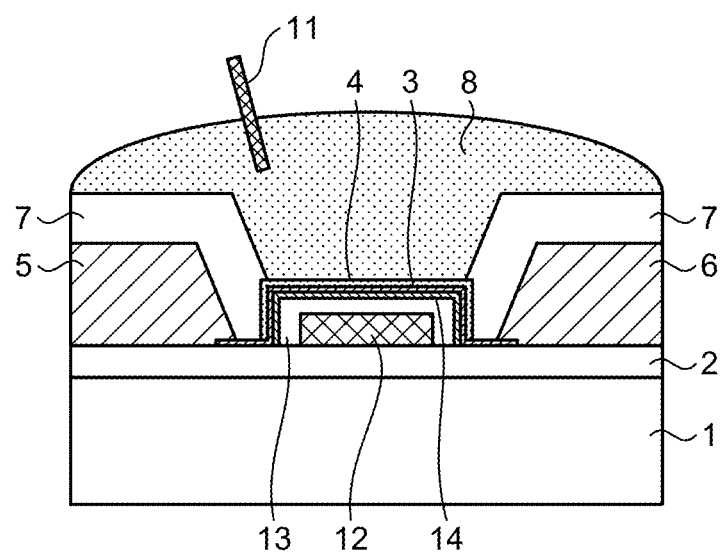
FIG. 10B is a diagram illustrating an example of providing a hydrophobic film between layers of a solid insulating film and a channel.

Here, FIG. 10B is a diagram illustrating an example of providing a hydrophobic film 14 between the layers of the solid insulating film layer 13 and the channel 3 to prevent the sample 8 from permeating interface between the channel 3 and the solid insulating film layer 13. In the example illustrated in FIG. 10B, the hydrophobic film 14 is coated with, for example, a parylene film, fluororesin, or a self-assembled monolayer (SAM) film that exhibits hydrophobicity.

Figure 11:
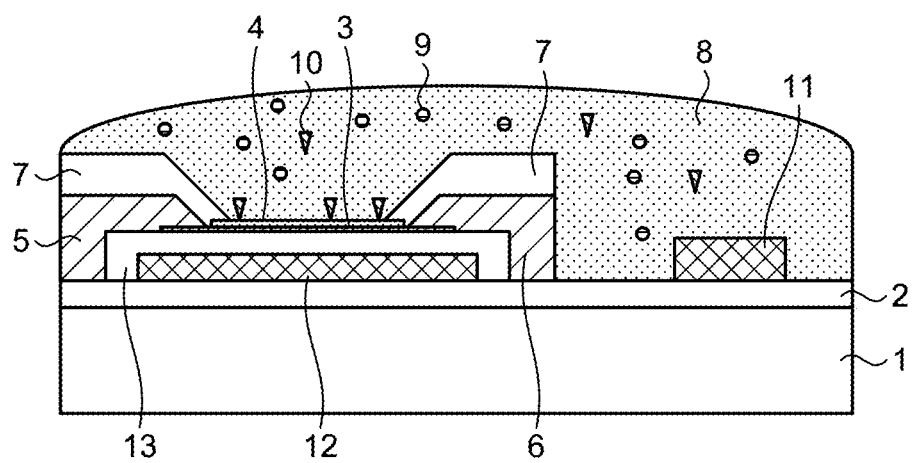
FIG. 11 is a diagram illustrating a modification of arrangement of a first gate electrode.

Here, FIG. 11 is a diagram illustrating a modification of the arrangement of the first gate electrode 11. In FIG. 6 to FIG. 9, the first gate electrode 11 is arranged above the receptor layer 4, but the first gate electrode 11 does not have to be arranged above the receptor layer 4 as long as it is possible to have the sample 8 therebetween. For example, as illustrated in FIG. 11, the first gate electrode 11 may be formed on the same plane as the source/drain electrodes 5 and 6.

Next, a biosensor array with the aforementioned sensor array is described.

Figure 12A:
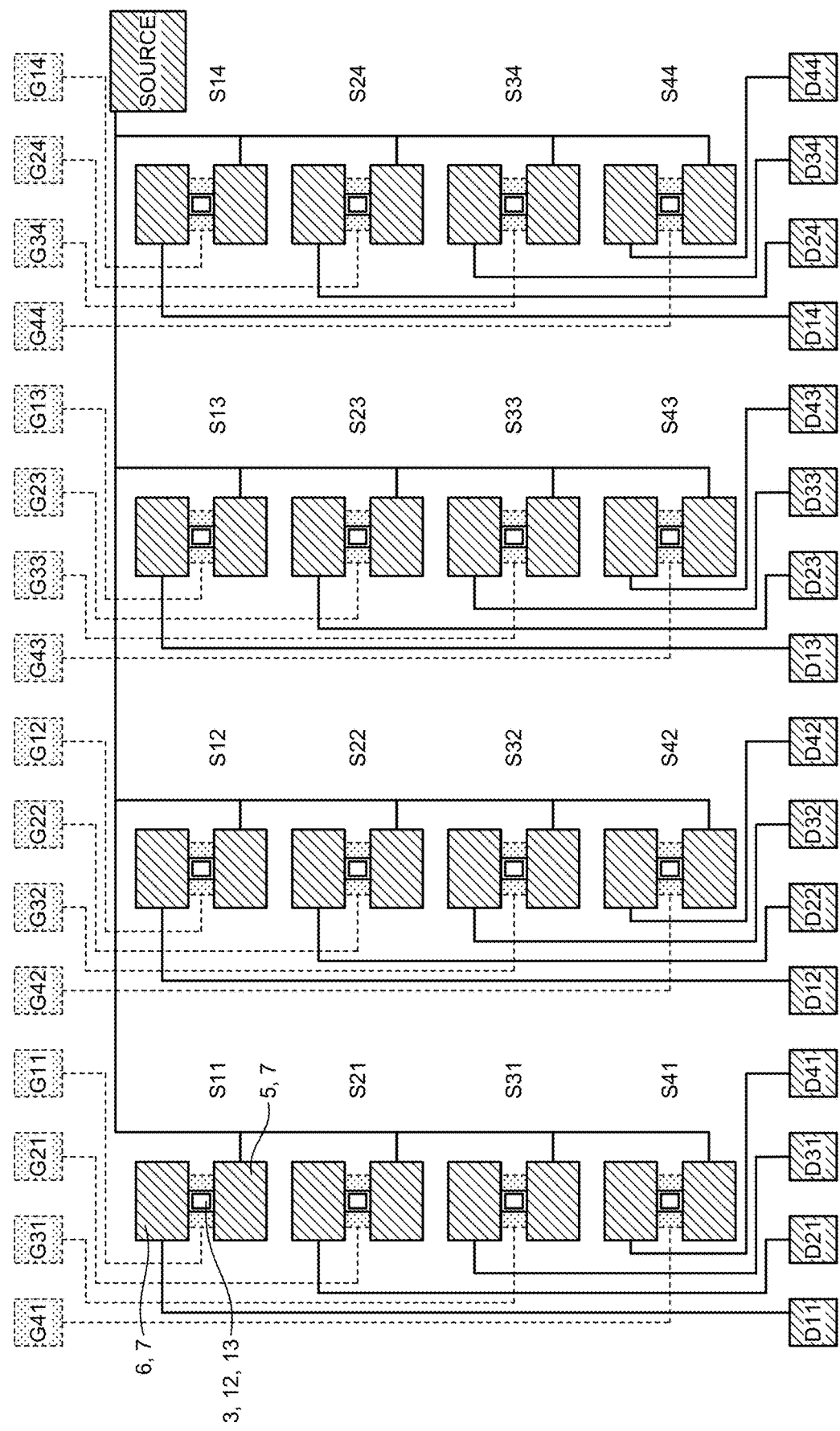
FIG. 12A is a plan view illustrating a biosensor array.

Here, FIG. 12A is a plan view illustrating the biosensor array. The 4×4 biosensor array illustrated in FIG. 12A includes sensors S11 to S44 according to this embodiment. In FIG. 12A, the reference sign 3 denotes the channel, the reference signs 8 and 6 denote the source/drain electrodes, the reference sign 7 denotes the insulating film, the reference sign 12 denotes the second gate, and the reference sign 13 denotes the solid insulating film layer. Although not illustrated in the drawing in particular, on the structure illustrated in FIG. 12A, the receptor layer 4 (the region on the channel 3 where the insulating film 7 does not exist), the sample 8 containing the substance 9 other than the target substance 10 and the target substance 10, and the first gate 11 are formed.

The source is common to all sensors, and the second gate voltage and the drain voltage can fee applied to each sensor. For example, the second gate voltage of the sensor S11 is applied from an opening region G11 that connects to the second gate electrode 12 and the drain voltage Is applied from an opening region D11 that connects to the drain electrode.

Figure 12B:
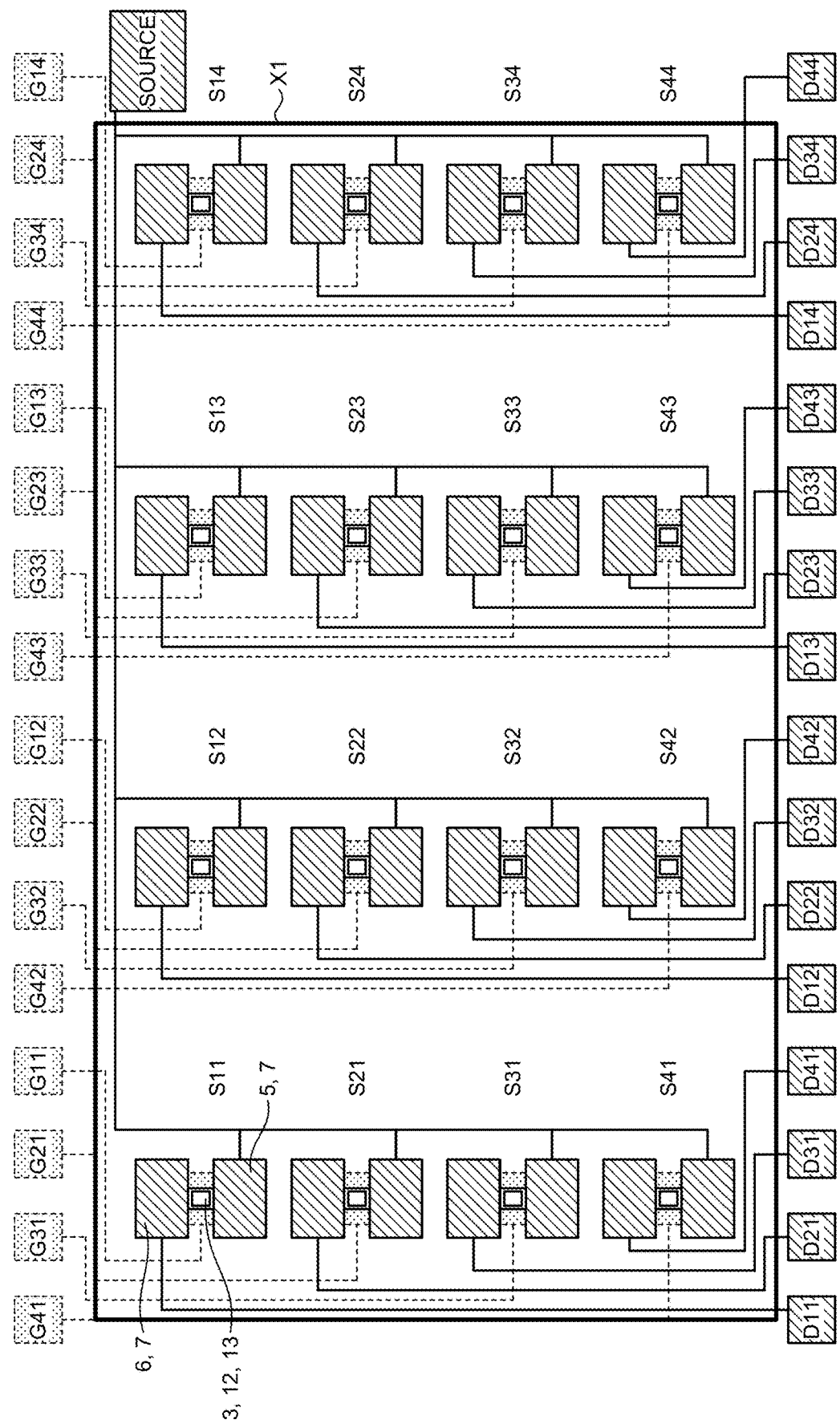
FIG. 12B is a plan view illustrating a modification of the biosensor array.

FIG. 12B is a plan view illustrating a modification of the biosensor array.

The opening region that opens on the channel 3 of each of the sensors S11 to S44 needs to be covered with the sample 8 and the opening regions D11 to D44 that open on the drain electrodes 6 and the opening region that opens on the source electrode 5 are preferably not covered with the sample 8. The opening regions G11 to G44 that open on the second gate electrodes 12 should not be covered with the sample 8. Therefore, in the modification illustrated in FIG. 12B, a dam material X1 that seamlessly surrounds the opening region of the channel 3 of each of the sensors S11 to S44 is provided to separate the opening region of each electrode from the opening region of the channel 3. The dam material X1 prevents the sample 8 from wetting and spreading to the opening region of each electrode when the sample 8, which is a subject to be tested, is dropped.

There are no restrictions on the shape, size, or material of the dam material X1, as long as the contact of the sample 8 with the opening region of each electrode can be prevented. However, to prevent the sample 8 from overflowing out of the dam material X1, the height of the dam material X1 is preferably 1 mm or more. The dam material X1 may be placed doubly.

The dam material X1 preferably has high adhesiveness with the substrate 1 to prevent the sample 8 from leaking out from the surface where the dam material X1 and the substrate 1 are in contact. Furthermore, the dam material X1 is preferably water-repellent to prevent the sample 8 from wetting and spreading, because the entire opening region of the channel 3 needs to be wetted with the sample 8. In view of this, the dam material X1 is formed of silicone rubber, for example.

FIG. 12C is a plan view illustrating another modification of the biosensor array.

In the modification illustrated in FIG. 12C, in addition to the first dam material X1 that surrounds the sensors S11 to S44, there are a second dam material X2 that surrounds the opening regions D11 to D44 of the drain electrodes and a third dam material X3 that surrounds the opening regions G11 to G44 of the second gate electrodes. This structure has the effect of, even if some of the sample 8, which is a solution, overflows out of the first dam material X1 due to vibration or tilting, preventing the overflowing sample 8 from touching the drain electrode 6 or the second gate electrode 12. The second dam material X2 and the third dam material X3 are formed in the manner similar to the first dam material X1, and are formed of silicone rubber, for example. The height of the second dam material X2 and the third dam material X3 is preferably 1 mm or more in the manner similar to the first dam material X1.

Figure 12D:
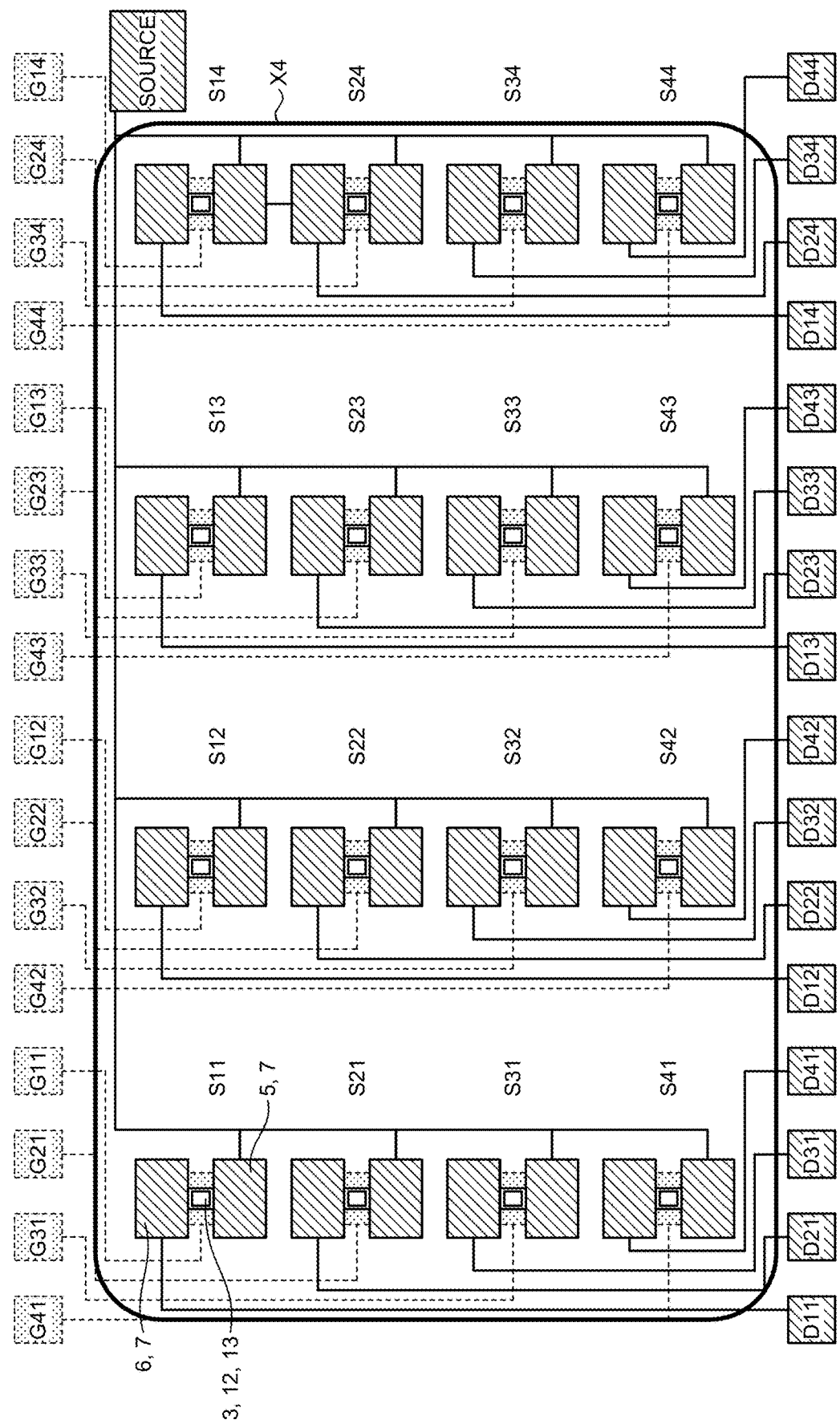
FIG. 12D is a plan view illustrating yet another modification of the biosensor array.

FIG. 12D is a plan view illustrating yet another modification of the biosensor array.

In the modification illustrated in FIG. 12D, a dam material X4 is provided so as to surrounds the sensors SIX to S44. As illustrated in FIG. 12D, the four corners of the dam material X4 are rounded. Rounding the four corners of the dam material X4 in this way can obtain the following effects: the dam material X4 is less likely to break and the components of the sample 8 do not remain in the four corners of the dam material X4 when the sample 8, which is the solution, is replaced.

As illustrated in FIG. 12D, the dam material X4 is arranged to contain the source regions and the drain regions of the sensors S11 to S44 in addition to the opening regions that open on the sensors S11 to S44. This structure can eliminate the temperature difference between the source regions and the drain regions of the sensors S11 to S44 by the dam material X4 when the temperatures of the sample 8, which is the solution, and the substrate 1 are different, thereby having the effect of eliminating the error of the sensors S11 to S44 caused by the temperature difference.

The dam material X4 is formed of silicone rubber, for example, in a manner similar to the dam material X1. The height of the dam material X4 is preferably 1 mm or more in a manner similar to the dam material X1.

The sensors S11 to S44 are preferably positioned point-symmetric to the drop part of the sample 8 to ensure that the sample 8 wets and spreads in the opening regions of the channels 3 of all sensors S11 to S44.

It is possible to form the different receptor layers 4 for the respective sensors S11 to S44, and it is possible to sense the same number of substances as the arrayed sensors. Since the amount of carriers transferring to the channel 3 differs depending on the type of the receptor layer 4, the Fermi level also differs, and the reference voltage is considered to be different for each of the sensors S11 to S44. This different reference voltage can be controlled by the individual sensors S11 to S44 by the second gate voltage.

When sensing the hormone balance from saliva, blood, urine, tears, and sweat, for example, using the 4×4 biosensor array illustrated in FIG. 12A, a plurality of hormones among the following hormones can be sensed at the same time: estrone, estradiol, estriol, progesterone, testosterone, dihydrotestosterone (DHT), androstenedione, androsterone, cortisol (hydrocortisone), serotonin, dopamine, oxytocin, adrenaline, noradrenaline, melatonin, erythropoietin, and the like. The 4×4 biosensor array illustrated in FIG. 12A makes it possible to find not only the absolute amount of each of the hormones, but also the balance of the hormones compared to each other from a single sample.

Figure 13A:
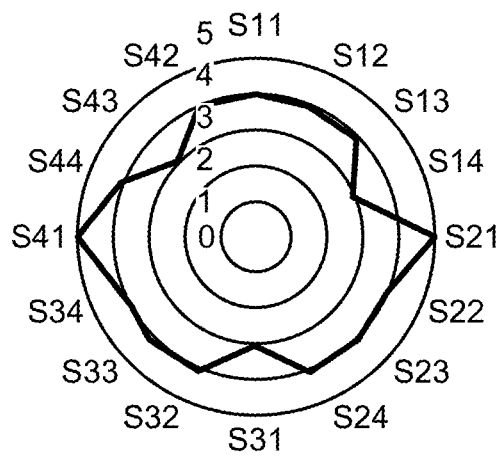
FIG. 13A is a diagram illustrating an example in which hormone bias is visualized.
Figure 13A:
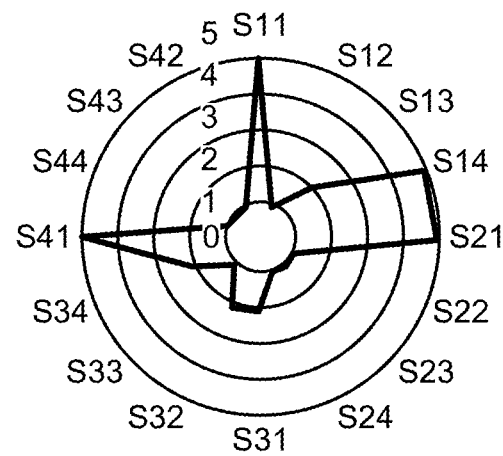

FIG. 13A is a diagram illustrating an example in which the hormone bias is visualized. By devising the positions of the sensors S11 to S44 in the sensor array, it is also possible to visualize the hormone bias, etc., as illustrated in FIG. 13A.

In addition, FIG. 13B is a diagram illustrating an example in which the stress level, the happiness level, the health level, and motivation are visualized. In the example illustrated in FIG. 13B, the sensors S11 to S14 detect hormones that are secreted when humans feel stressed (for example, cortisol, adrenaline, or noradrenaline). Displaying this sensing result makes it easier to find the stress level.

Next, the sensors S21 to S24 detect oxytocin, serotonin, and dopamine, which are called happiness hormones. Displaying this sensing result makes it easier to find the happiness level.

In addition, the sensors S31 to S34 detect hormones related to health (for example, melatonin or erythropoietin). Displaying this sensing result makes it easier to find the health level.

Finally, the sensors S41 to S44 detect hormones related to motivation (for example, adrenaline, or sex hormones such as testosterone, progesterone, estrogen, and estriol). Displaying this sensing result makes it easier to find the degree of motivation such as eagerness.

The example in FIG. 23B illustrates a comprehensive visualization of the balance among the four domains of the stress level, the happiness level, the health level, and the motivation. Such visualization makes it possible to find the conditions of mental health. By monitoring these pieces of data on a daily basis, it is possible to grasp the user's mental condition and biomarkers related to lifestyle-related diseases, which can be useful for mental health care, lifestyle-related disease prevention, and so on.

Next, the specific control method for the reference voltage (Dirac voltage) is described.

Figure 14:
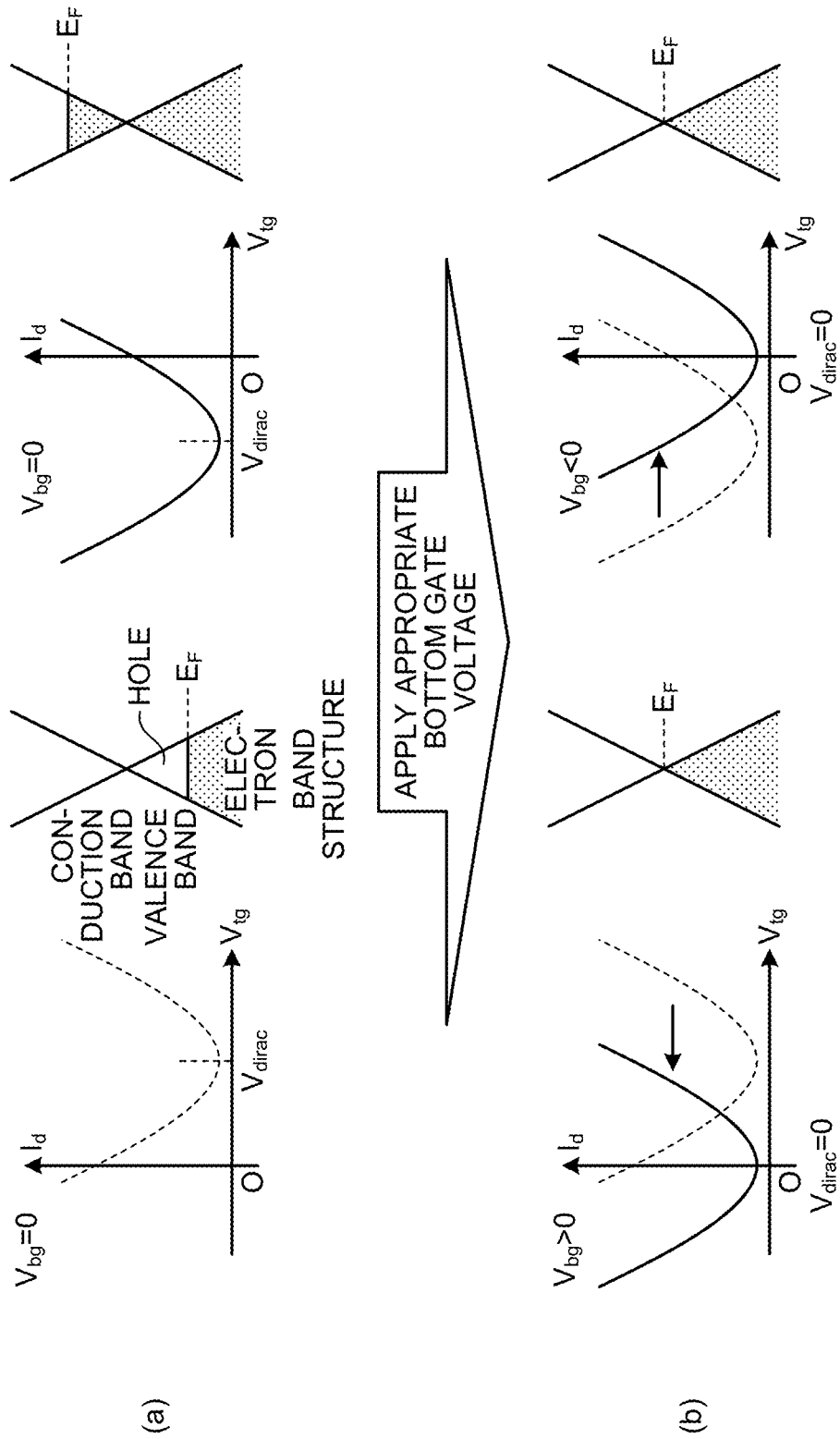
FIG. 14 is an explanatory view illustrating a specific control method for reference voltage (Dirac voltage)

Here, FIG. 14 is an explanatory view illustrating the specific control method for the reference voltage (Dirac voltage). FIG. 14 depicts the case that the channel 3 is graphene. When no voltage is applied to the second gate electrode 12 ($V_{bg}$=0), the transport characteristic of the voltage ($V_{tg}$) at the first gate electrode 11 vs. the drain current ($I_d$) flowing between the source/drain electrodes 5 and 6 and the band structure are as follows: carriers move unintentionally to the channel 3 from the insulating film 2, the receptor layer 4, the sample 8, etc. in contact with the channel 3 to cause hole or electron doping, and the reference voltage ($V_{dirac}$) that is the first gate voltage at the minimum point of the drain current $I_d$ in the transport characteristic deviates from 0 ($V_{dirac}$>0 in the case of hole doping, and $V_{dirac}$<0 in the case of electron doping) as illustrated in either one drawing at (a) in FIG. 14 (left drawing: hole doping, right drawing: electron doping). In the valence band of the band diagram in FIG. 14, the colored regions are filled with electrons, the uncolored regions are filled with holes, and $E_F$ represents the Fermi level.

Here, for simplicity, it is assumed that the hole-doped or electron-doped channel 3 is controlled to have the electrically neutral transport characteristic ($V_{dirac}$=0). First, in the case of hole doping (left at (a) in FIG. 14), positive voltage is applied to the second gate electrode 12 in advance ($V_{bg}$>0) to induce electrons in the channel 3 so as to control the Fermi level (electron density) of the channel 3. Measuring the transport characteristic of the voltage ($V_{tg}$) at the first gate electrode 11 vs. the drain current ($I_d$) flowing between the source/drain electrodes 5 and 6 with appropriate positive voltage applied to the second gate electrode 12 indicates that the first gate voltage at the minimum point of the drain current $I_d$ ($V_{dirac}$) can be controlled to 0 (left at (b) in FIG. 14). In the case of electron doping (right at (a) in FIG. 14), negative voltage is applied to the second gate electrode 12 in advance ($V_{bg}$<0) to induce holes in the channel 3 so as to control the Fermi level (electron density) of the channel 3. Measuring the transport characteristic of the voltage ($V_{tg}$) at the first gate electrode 11 vs. the drain current ($I_d$) flowing between the source/drain electrodes 5 and 6 with appropriate positive voltage applied to the second gate electrode 12 indicates that the first gate voltage at the minimum point of the drain current $I_d$ ($V_{dirac}$) can be controlled to 0 (right at (b) in FIG. 14).

In the conventional structures illustrated in FIG. 1 to FIG. 4, by using a conductive substrate (for example, highly doped silicon) as the substrate 1 and applying voltage to the carriers can be induced in the channel 3 to control the reference voltage; however, when the sensors are arrayed, the same voltage is applied to all sensors and in this case, the reference voltage cannot be controlled in each sensor.

Although the method of controlling the electron state of the channel 3 to be electrically neutral is described here for simplicity, the electron state can be controlled to be at any Fermi level by the above method. In other words, in the arrangement as the array, it is possible to align all Fermi levels ($V_{dirac}$), or to set different Fermi levels ($V_{dirac}$) in the respective sensors.

Figure 15A:
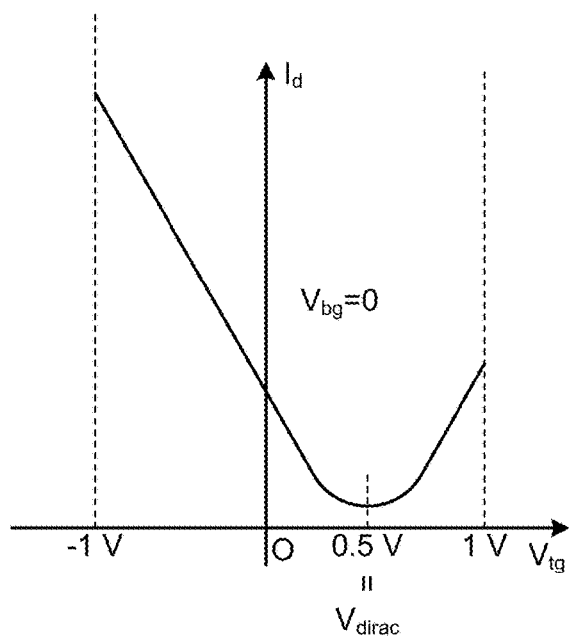
FIGS. 15A and 15B are diagrams illustrating how to find the reference voltage.
Figure 15B:
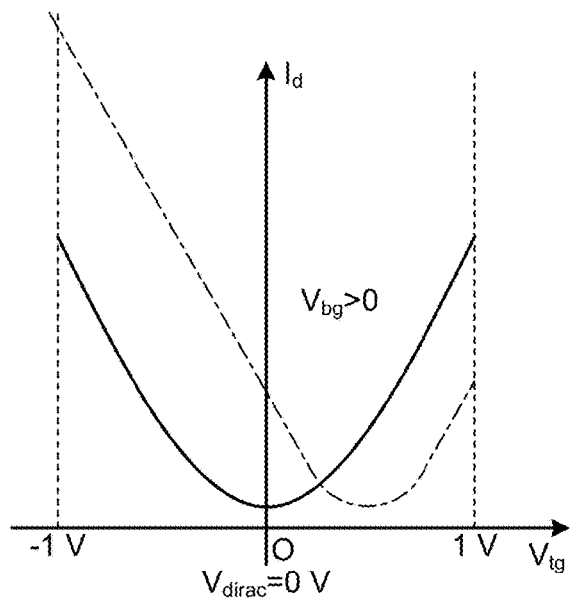

As mentioned above, the reference voltage $V_{dirac}$ can be ascertained by measuring the drain current $I_d$ flowing between the source/drain electrodes 5 and 6 when no voltage is applied to the second gate electrode 12 ($V_{bg}$=0) and the voltage $V_{tg}$ is swept across the first gate electrode 11 in the appropriate range. For example, the reference voltage $V_{dirac}$ is the voltage $V_{tg}$ at which the drain current $I_d$ is minimized when the voltage $V_{tg}$ is swept at $V_{bg}$=0 in the range of −1 V to +1 V with step 0.01 V. Here, FIGS. 15A and 15B are diagrams illustrating how to find the reference voltage. In the example illustrated in FIG. 15A, the reference voltage $V_{dirac}$=0.5 V is obtained.

The reference voltage $V_{dirac}$ can be controlled to certain voltage by applying appropriate voltage to the second gate electrode 12. Here, it is assumed to obtain the reference voltage $V_{dirac}$=0 V. In the example illustrated in FIG. 15A, it is understood that the channel 3 is hole-doped because the reference voltage $V_{dirac}$>0. To set the reference voltage $V_{dirac}$=0, electrons need to be induced in the channel 3. Therefore, by applying positive voltage to the second gate electrode 12, electrons are induced in the channel 3 through the solid insulating film layer 13. By applying the appropriate voltage, the reference voltage can be adjusted to $V_{dirac}$=0 V.

In the case of actually operating as a device, $I_d$ (drain current) is measured with the voltage $V_{tg}$ (first gate voltage), the voltage $V_{bg}$ (second gate voltage), and $V_d$ (drain voltage) fixed and the change amount of the drain current $I_d$ is detected. In this case, by fixing $V_{tg}$ at the point where the change amount of the drain current $I_d$ becomes larger, that is, at the point where the absolute value of mutual conductance gm (slope of the graph of transport characteristic $V_{tg}$-$I_d$: $\Delta I_d / \Delta V_{tg}$) becomes larger, the larger change of $I_d$ can be captured by the small change of the reference voltage $V_{dirac}$.

Figure 16:
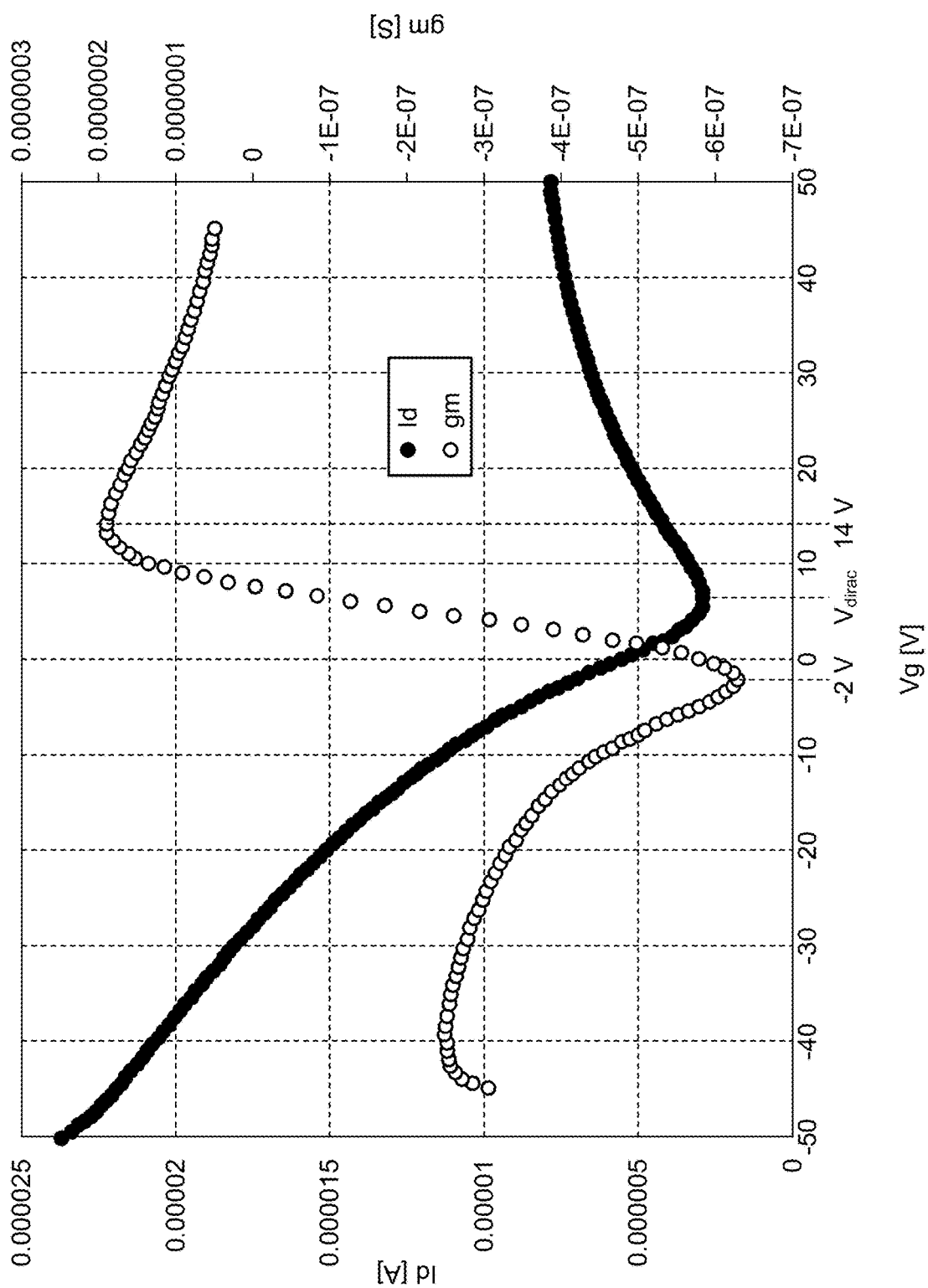
FIG. 16 is a diagram illustrating an example of mutual conductance.

Here, FIG. 16 is a diagram illustrating an example of mutual conductance. As illustrated in FIG. 16, in the use on the hole operation side ($V_g$<$V_{dirac}$), $V_g$=−2 V, which maximizes the absolute value of the mutual conductance is applied, and in the use on the electron operation side ($V_g$>$V_{dirac}$), $V_g$=14 V is applied to achieve higher sensitivity measurements.

Figure 17:
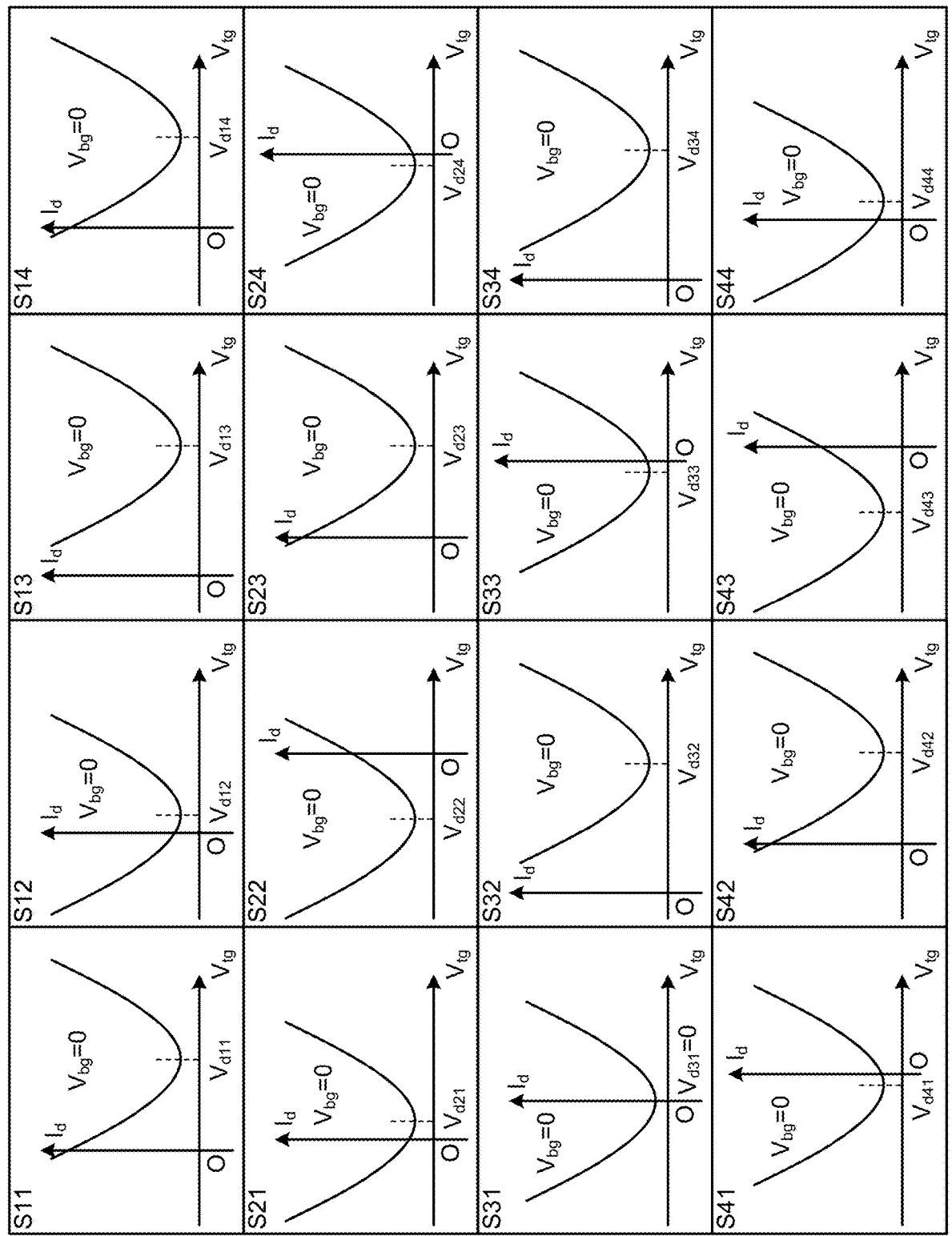
FIG. 17 is a diagram illustrating an example of the transport characteristic of each sensor in the biosensor array in FIG. 12A.
Figure 18:
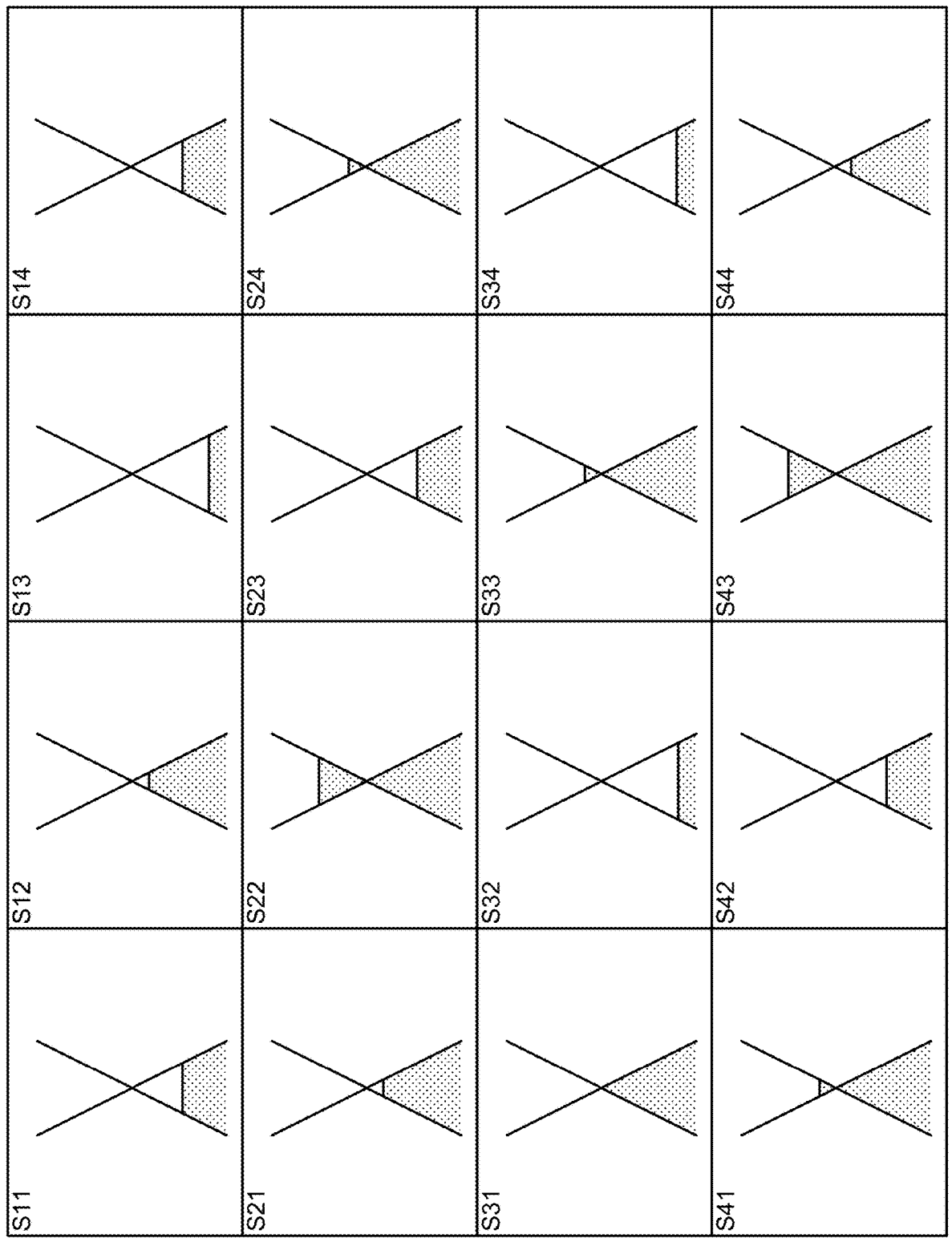
FIG. 18 is a diagram illustrating a band structure of each sensor in FIG. 17.

Here, FIG. 17 is a diagram illustrating an example of the transport characteristic of each sensor in the biosensor array of FIG. 12A, and FIG. 18 is a diagram illustrating the band structure of each sensor in FIG. 17. FIG. 17 and FIG. 18 illustrate examples of the transport characteristics of the respective sensors (S11 to S14) when no voltage is applied to G11 to G14 ($V_{bg}$=0) in the biosensor array of FIG. 12A.

As illustrated in FIG. 18, the first gate voltage at the minimum point of the drain current $I_d$ of the sensors (S11 to S14) ($V_{d11}$ in the case of S11) varies due to carrier doping from the insulating film 2 and the receptor layer 4. If the sensing target substance is changed for each sensor, it is considered that the first gate voltage at the minimum point of the drain current $I_d$ of the sensors (S11 to S14) will inevitably be different because the receptor layer 4 is different for each sensor.

Figure 19:
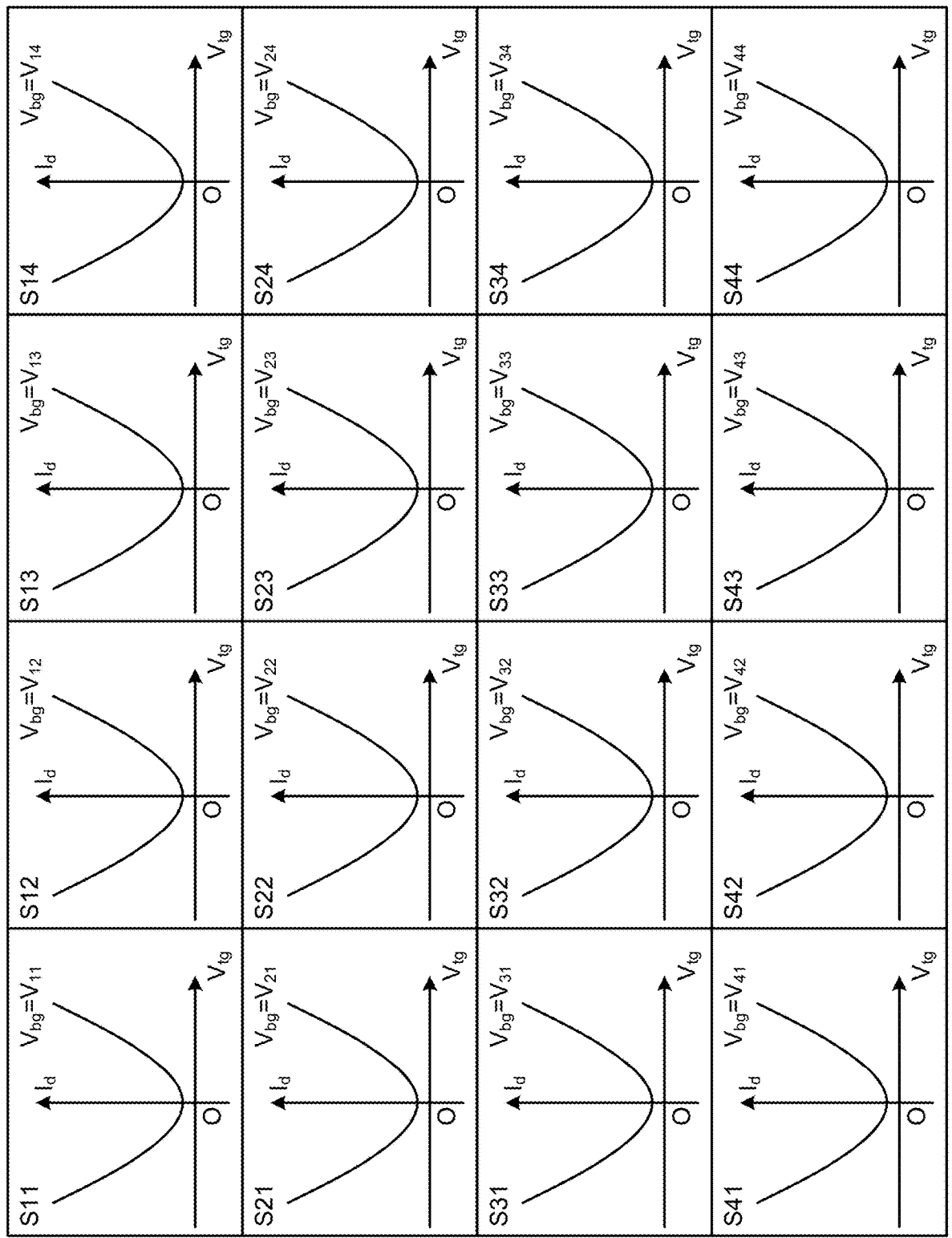
FIG. 19 is a diagram illustrating an example of the transport characteristic of each sensor in the biosensor array in FIG. 12A.
Figure 20:
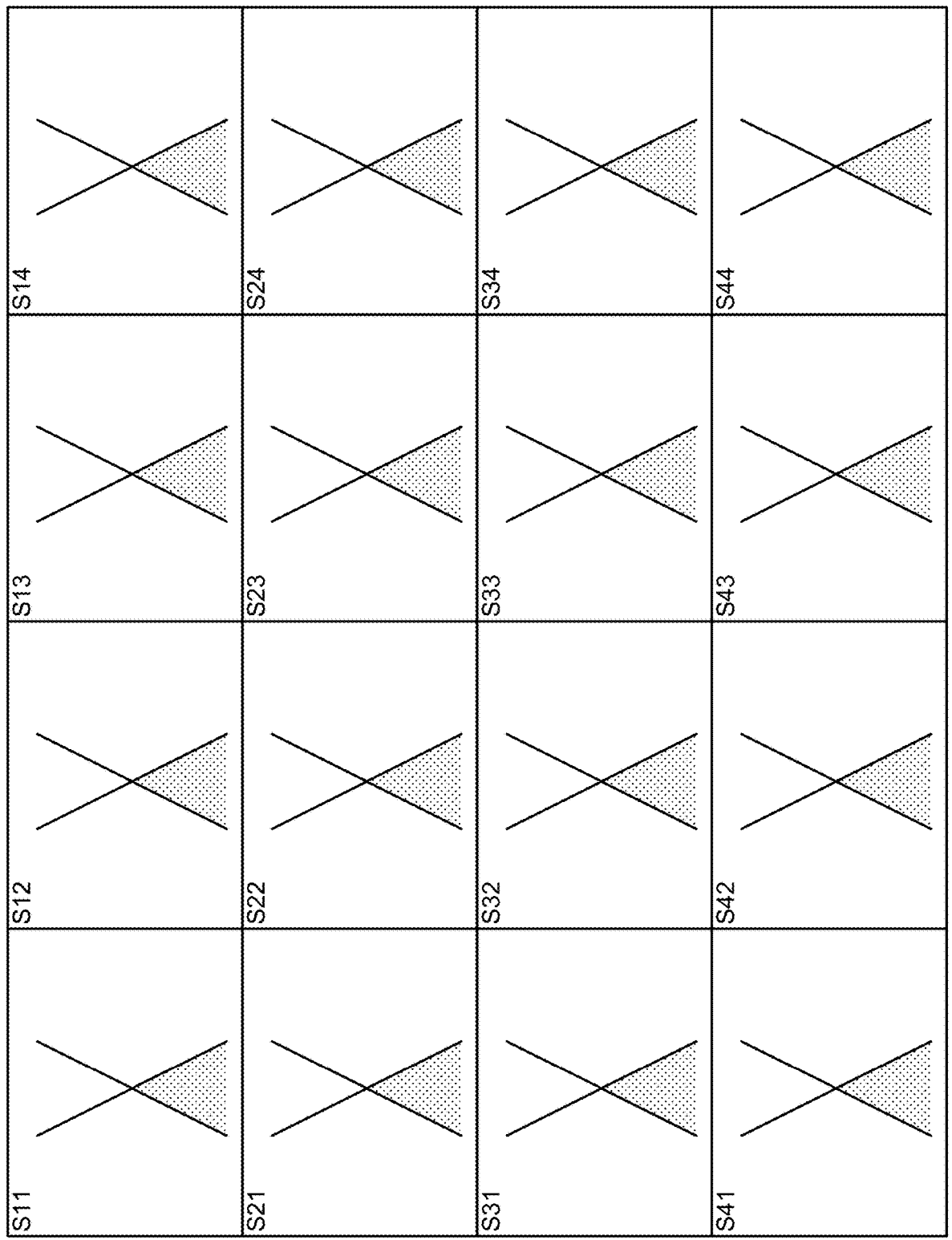
FIG. 20 is a diagram illustrating the band structure of each sensor in FIG. 19.

FIG. 19 is a diagram illustrating an example of the transport characteristic of each sensor in the biosensor array of FIG. 12A, and FIG. 20 is a diagram illustrating the band structure of each sensor in FIG. 19. FIG. 19 and FIG. 20 illustrate the transport characteristics of the sensors (S11 to S14) when the appropriate voltage is applied to G11 to G14. These are the transport characteristics of the sensors (S11 to S14) when the second gate voltage ($V_{bg}=V_{11}$ to $V_{44}$) is applied to G11 to G14 in the biosensor array in FIG. 12A so that $V_{d11}=V_{d12}\ldots=V_{44}=0$ is obtained. For simplicity, the second gate voltage is applied so that $V_{d11}=V_{d12}=\ldots=V_{d44}=0$ is obtained in this case; however, it is also possible to set any first gate voltage at the minimum point of drain current $I_d$ at each sensor (S11 to S14) ($V_{d11}$ for S11).

Next, a specific manufacturing method for the dual-gate FET illustrated in FIG. 5 is described.

First, the silicon (Si) substrate 1 is thermally oxidized and a thermally oxidized film ($SiO_2$) with a thickness of 100 nm is used as the insulating film 2.

Next, photoresist is patterned on the insulating film 2 using photolithography technology, Ti/Pt/Au (5/80/100 nm) is evaporated in order from the bottom, and the photoresist is peeled off (lifted off) to form the second gate electrode 12.

Next, an $Al_2O_3$ film with a thickness of 75 nm is formed thereon by an atomic layer deposition (ALD) method to form the insulating film 13.

Next, graphene, which is the material for the channel 3, is transferred onto the insulating film 13, and then the photoresist is patterned using photolithography technology and the unnecessary area of graphene is ashed with $O_2$ plasma. Then, the resist is peeled off and accordingly, graphene is formed only in the channel region of the transistor.

Then, the photoresist is patterned by photolithography technology to make the gate length (the distance between the source electrode and the drain electrode) 100 μm and the gate width 100 μm, Ti/Ni/Au (5/20/150 nm) are evaporated in order from the bottom, and the resist is peeled off (lifted off) to form the source/drain electrodes 5 and 6.

Furthermore, the insulating film 7 made of fluorine-based photosensitive resin is formed toy photolithography technology so as to prevent contact between the source/drain electrodes 5 and 6 and the sample 8. The insulating film 7 may be formed by evaporation of parylene, or by film formation of $Al_2O_3$ or $SiO_x$ by the ALD method described above and then forming an opening through wet etching of a channel opening part and a PAD part.

The receptor layer 4 is, for example, a molecular imprinting polymer, which is formed on the aforementioned graphene by, for example, electric field polymerization. For example, phenylenediamine is used as a monomer and is made into a solution together with the molecule (template) to be detected, and the polymerization reaction is caused on graphene through charge transfer between the solution and graphene via the source electrode and the drain electrode described above.

The template is then removed by cleaning to form a molecular template that specifically captures the template.

Thus, according to this embodiment, by controlling the second gate that controls the reference voltage for transport characteristics, it is possible to apply different bottom gate voltages to the respective sensors individually in the transistor array, and to suppress and control characteristic variations between the sensors in the transistor array and to perform accurate measurement, which is advantageous.

Second Embodiment

Next, a second embodiment is described.

The second embodiment is different from the first embodiment in that the channel 3 is disposed on the source/drain electrodes 5 and 6. In the second embodiment, description of the same parts as the first embodiment will be omitted, and the parts that differ from the first embodiment will be described.

Figure 21:
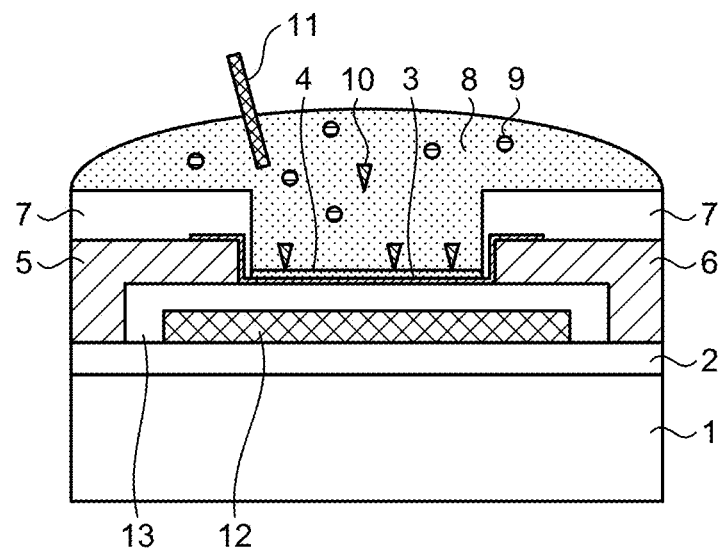
FIG. 21 is a schematic cross-sectional view illustrating a sensor utilizing a dual-gate FET according to a second embodiment.

Here, FIG. 21 is a schematic cross-sectional view illustrating a sensor utilizing a dual-gate FET according to the second embodiment. The sensor using the dual-gate FET illustrated in FIG. 21 differs from the structures illustrated in FIG. 5 to FIG. 9 in that the channel 3 is disposed on the source/drain electrodes 5 and 6, but has the functions equivalent to the structures illustrated in FIG. 5 to FIG. 9.

With the sensor using the dual-gate illustrated in FIG. 21, since the channel 3 is formed after the source/drain electrodes 5 and 6 are formed in the device manufacturing process, it is possible to suppress damage on the channel 3 and unintended doping during the process.

Third Embodiment

Next, a third embodiment is described.

The third embodiment is different from the first embodiment in that the second gate electrode 12 is embedded in the insulating film 2. In the third embodiment, description of the same parts as the first embodiment will be omitted, and the part that differ from the first embodiment will be described.

Figure 22:
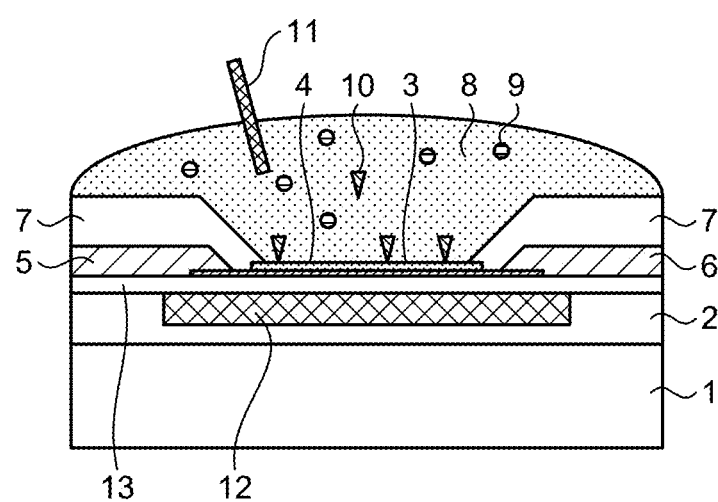
FIG. 22 is a schematic cross-sectional view illustrating a sensor utilizing a dual-gate FET according to a third embodiment.

Here, FIG. 22 is a schematic cross-sectional view illustrating a sensor utilizing a dual-gate FET according to the third embodiment. The sensor using the dual-gate FET illustrated in FIG. 22 differs from the structures illustrated in FIG. 5 to FIG. 9 in that the second gate electrode 12 is embedded in the insulating film 2, but has the functions equivalent to the structures illustrated in FIG. 5 to FIG. 9.

With the sensor using the dual-gate FET illustrated in FIG. 22, the channel 3 can be formed flat, and unintended damage and doping due to stress, and the like, can be suppressed.

Fourth Embodiment

Next, a fourth embodiment is described.

The fourth embodiment is different from the first embodiment in that the source/drain electrodes 5 and 6 are embedded in the insulating film 13. In the fourth embodiment, description of the same parts as the first embodiment will be omitted, and the parts that differ from the first embodiment will be described.

Figure 23:
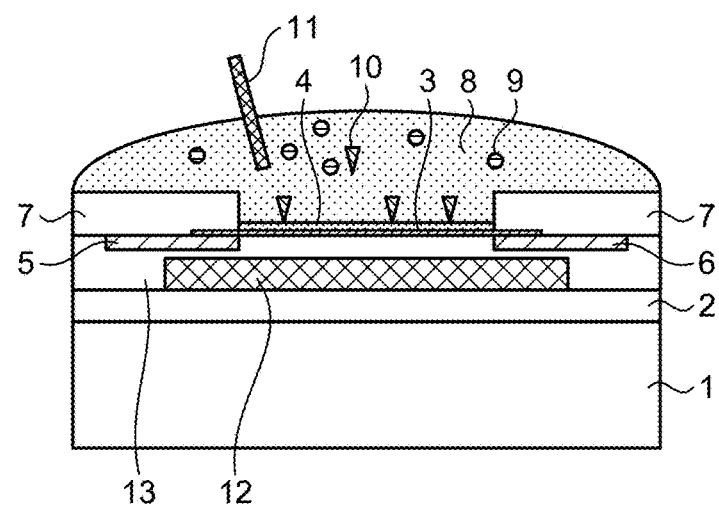
FIG. 23 is a schematic cross-sectional view illustrating a sensor utilizing a dual-gate FET according to a fourth embodiment.

Here, FIG. 23 is a schematic cross-sectional view illustrating a sensor utilizing a dual-gate FET according to the fourth embodiment. The sensor using the dual-gate FET illustrated in FIG. 23 differs from the structures illustrated in FIG. 5 to FIG. 9 in that the source/drain electrodes 5 and 6 are embedded in the insulating film 13, but has the functions equivalent to the structures illustrated in FIG. 5 to FIG. 9.

With the sensor using the dual-gate FET illustrated in FIG. 23, the channel 3 is formed after the source/drain electrodes 5 and 6 are formed in the device manufacturing process and the channel 3 can be formed flat; therefore, it is possible to suppress damage on the channel 3 and unintended doping during the process, unintended damage or doping due to stress, and the like.

Fifth Embodiment

Next, a fifth embodiment is described.

The fifth embodiment is different from the first embodiment in that the source/drain electrode 5' and the source/drain electrode 6 are integrated. In the fifth embodiment, description of the same parts as the first embodiment will be omitted, and the parts that differ from the first embodiment be described.

This embodiment describes a transistor array combining multiple dual-gate FETs and digital logic circuits such as an inverter and a ring oscillator.

Figure 24:
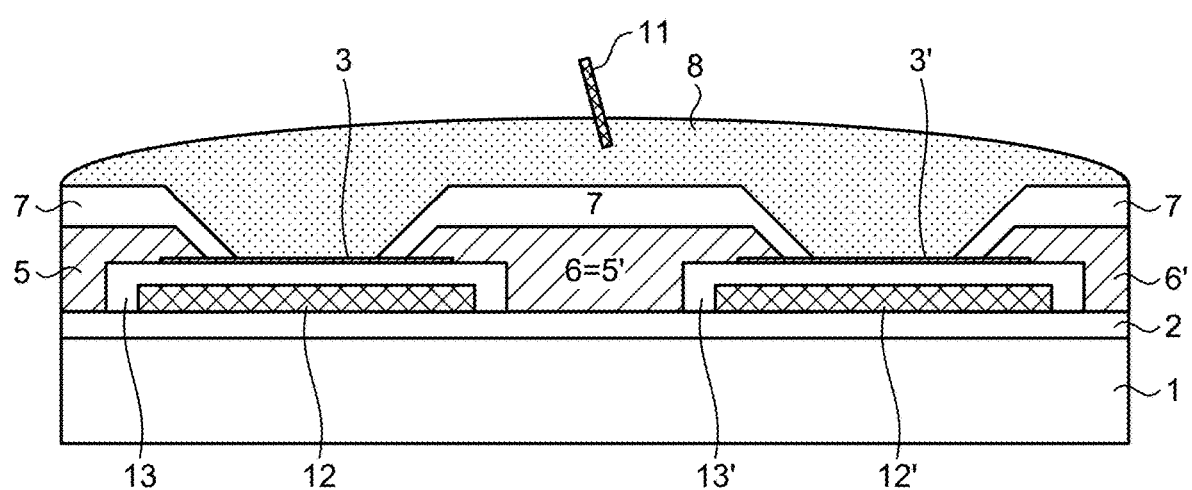
FIG. 24 is a schematic cross-sectional view illustrating a dual-gate FET array according to a fifth embodiment.

Here, FIG. 24 is a schematic cross-sectional view illustrating a dual-gate FET array according to the fifth embodiment. As illustrated in FIG. 24, the source/drain electrode 5'=6 in the dual-gate FET array in this embodiment.

As mentioned above, the fact that the reference voltage can be controlled by the voltage applied to the second gate electrode 12 means that the N-type or P-type can be controlled freely.

Figure 25:
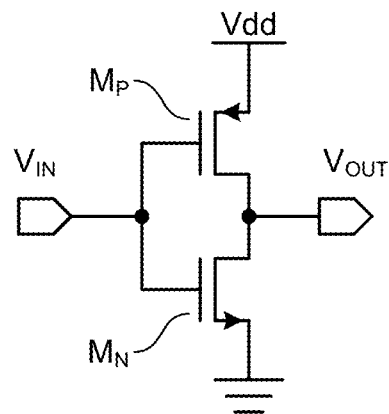
FIG. 25 is a circuit diagram illustrating a low-voltage CMOS inverter circuit (logic inversion circuit)
Figure 26:
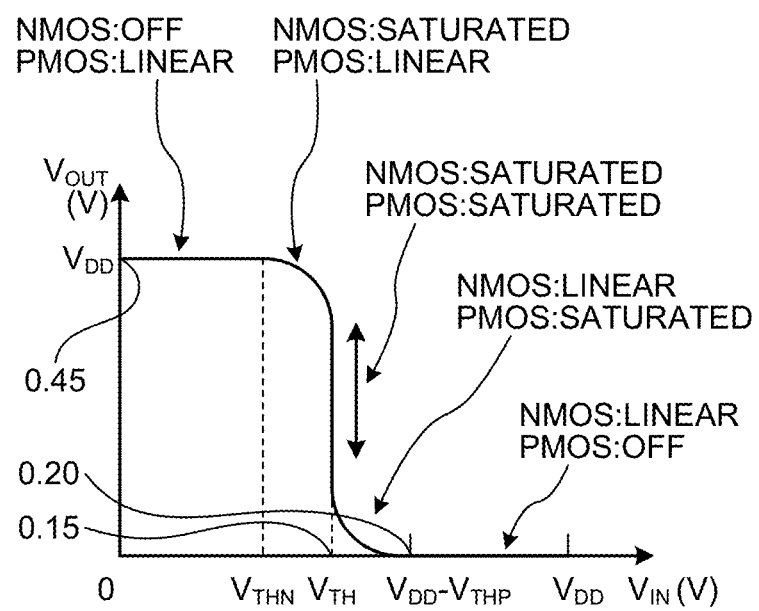
FIG. 26 is a diagram illustrating the input/output characteristics of the low-voltage CMOS inverter circuit.

FIG. 25 is a circuit diagram illustrating a low-voltage CMOS inverter circuit (logic inversion circuit), and FIG. 26 is a diagram illustrating the input/output characteristics of the low-voltage CMOS inverter circuit. In the circuit illustrated in FIG. 25, Vdd and Vss are power supply lines (Vdd has a potential difference of about 0.5 to 1.0 V relative to Vss), VIN is an input signal line, and VOUT is an output signal line. The Vdd side is a p-channel metal oxide semiconductor field effect transistor (pMOSFFT) MP and the Vss side is an n-channel metal oxide semiconductor field effect transistor (nMOSFET) MN. When the input VIN has the same potential as Vss, the above PMOSFET becomes on and the lower nMOSFET becomes off. At this time, the potential of the output VOUT is approximately equal to Vdd. When the input VIN has the same potential as Vdd, the above pMOSFET becomes off and the lower nMOSFET becomes on. Therefore, the potential of the output VOUT is approximately equal to Vss. Thus, the potential opposite to the input VIN will appear at the output VOUT.

As illustrated in FIG. 26, the power supply voltage Vdd is 450 mV. In this example, when the potential of the input VIN exceeds 0.15 V, the potential of the output VOUT changes from 0.45 V at the power supply voltage Vdd to 0 V. In other words, the input potential to determine the logic between "0" and "1" (the input potential of the logic inversion threshold) is 0.15 V. As illustrated in the input/output characteristics of the low-voltage CMOS inverter circuit in FIG. 26, they are the logic inversion threshold potential of the pMOSFET and the logic inversion threshold potential of the nMOSFET.

In FIG. 24, the second gate voltage can be adjusted so that one operates as a P-type and one as an N-type, and since N-type and P-type can be manufactured on the same plane, an inverter circuit of the logic circuit can be realized. As illustrated in FIG. 24, if the source/drain electrode 5' and the source/drain electrode 6 are electrically connected (integrated) and adjusted to operate as N-type and P-type, respectively, with the second gate electrode 12, they can be utilized as an inverter circuit (NOT gate) (the voltage applied to the first gate electrode 11 is $V_{IN}$, the voltage of the source/drain electrode 5'=6 at that time is $V_{OUT}$, $V_{OUT}$=Low when $V_{IN}$=High, and $V_{OUT}$=High when $V_{IN}$=Low).

A ring oscillator circuit, which can be made by connecting an odd number of inverters (NOT gates) in a cyclic manner, can also be realized.

Regarding the channel 3, since graphene has a small current ON/OFF ratio and current saturation is difficult (there is almost no saturation region), graphene is not suitable for logic circuits; meanwhile, carbon nanotubes and so on with a large current ON/OFF ratio and the explicit saturation region are preferable in the use as the logic circuits.

Although the preferred embodiments of the present invention have been described in detail above, the present invention is not limited to the particular embodiments, and various modifications and changes are possible within the range of the gist of the present invention as described in the scope of claims.

Aspects of the present invention are, for example, as follows.

<1> A semiconductor device includes:
   a first gate electrode;
   a first insulating unit provided on a second gate electrode configured to control a reference voltage in a transport characteristic;
   a source electrode connected to the first insulating unit;
   a drain electrode connected to the first insulating unit; and
   a contact part provided between the source electrode and the drain electrode on the first insulating unit, and being able to be in contact with a sample, in which
   the sample is able to be in contact with the first gate electrode, and
   a surface to the first insulating unit, of the contact part opposite is configured to be in contact with the sample.

<2> In the semiconductor device according to <1>, the contact part includes a channel between the source electrode and the drain electrode.

<3> In the semiconductor device according to <2>, the contact part includes the receiving unit capable of interacting with a predetermined substance contained in the sample.

<4> In the semiconductor device according to <3>, the receiving unit is provided on the channel.

<5> in the semiconductor device according to <3> or <4>, the receiving unit is a molecular imprinting polymer with a molecular template of the substance.

<6> In the semiconductor device according to any of <2> to <5>, the channel includes an of graphene, carbon nanotube (CNT), and a CNT network including a number of CNTs.

<7> In the semiconductor device according any of <1> to <6>, the second gate electrode is provided on a substrate, and
   the first gate electrode is provided on the substrate on which the second gate electrode is provided.

<8> In the semiconductor device according to any of <1> to <7>, a width of the second gate electrode is equal to or more than a distance between the source electrode and the drain electrode.

<9> A biosensor includes the semiconductor device according to any of <1> to <8>, in which
   the substance is detected by utilizing a characteristic change due to a change in charge of the contact part in accordance with a concentration of a predetermined substance contained in the sample.

<10> A biosensor array includes a combination of a plurality of the biosensors according to <9>.

<11> A logic circuit includes a combination of a plurality of the semiconductor devices according to any of <1> to <8>.

An embodiment provides an advantageous effect that it is possible to provide the semiconductor device, the biosensor, the biosensor array, and the logic circuit, in which the variation in characteristic between the sensors can be suppressed and controlled and accurate measurement is possible, even in the arrangement as an array.

The above-described embodiments are illustrative and do no limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A semiconductor device comprising:
a first gate electrode;
a first insulating unit, the first insulating unit including at least one first insulating layer provided on a second gate electrode configured to control a reference voltage in a transport characteristic;
a second insulating layer, the second gate electrode being stacked directly on the second insulating layer;
a source electrode connected to the first insulating unit;
a drain electrode connected to the first insulating unit;
a contact part provided between the source electrode and the drain electrode on the first insulating unit, and being able to be in contact with a sample, wherein
the sample is able to be in contact with the first gate electrode,
a surface opposite to the first insulating unit, of the contact part is configured to be in contact with the sample,
the at least one first insulating layer is stacked directly on the second insulating layer and the second gate electrode,
the source electrode and the drain electrode are stacked directly on the second insulating layer and the at least one first insulating layer, and
the at least one first insulating layer includes a material that is different from a material of the second insulating layer.

2. The semiconductor device according to claim 1, wherein the contact part includes a channel between the source electrode and the drain electrode.

3. The semiconductor device according to claim 2, wherein the contact part includes a receiving unit capable of interacting with a predetermined substance contained in the sample.

4. The semiconductor device according to claim 3, wherein the receiving unit is provided on the channel.

5. The semiconductor device according to claim 3, wherein the receiving unit comprises a molecular imprinting polymer with a molecular template of the substance.

6. The semiconductor device according to claim 2, wherein the channel includes any of graphene, carbon nanotube (CNT), and a CNT network including a number of CNTs.

7. The semiconductor device according to claim 1, wherein
the second gate electrode is provided on a substrate, and
the first gate electrode is provided on the substrate on which the second gate electrode is provided.

8. The semiconductor device according to claim 1, wherein a width of the second gate electrode is equal to or more than a distance between the source electrode and the drain electrode.

9. A biosensor comprising the semiconductor device according to claim 1, wherein
the sample contains a predetermined substance, and
the predetermined substance is detected by utilizing a characteristic change due to a change in charge of the contact part in accordance with a concentration of the predetermined substance contained in the sample.

10. A biosensor array comprising a combination of a plurality of the biosensors according to claim 9.

11. A logic circuit comprising a combination of a plurality of the semiconductor devices according to claim 1.

12. The semiconductor device according to claim 1, wherein the second insulating layer includes a silicon layer, a thermal oxide layer, or a plastic layer, the plastic layer including polyimide, PEN, or PET.

13. The semiconductor device according to claim 1, wherein the at least one first insulating layer includes an aluminum oxide layer, a silicon oxide layer, or a hafnium oxide layer.

14. The semiconductor device according to claim 1, wherein the at least one first insulating layer includes a plurality of first insulating layers.

* * * * *